US006064965A

United States Patent [19]

Hanson

[11] Patent Number: 6,064,965

[45] Date of Patent: May 16, 2000

[54] COMBINED AUDIO PLAYBACK IN SPEECH RECOGNITION PROOFREADER

[75] Inventor: Gary Robert Hanson, Palm Beach Gardens, Fla.

[73] Assignee: International Business Machines Corporation, Armonk, N.Y.

[21] Appl. No.: 09/146,384

[22] Filed: Sep. 2, 1998

[51] Int. Cl.[7] .............................. G10L 13/00; G10L 15/00

[52] U.S. Cl. ........................... 704/275; 704/270; 704/235

[58] Field of Search ..................................... 704/235, 270, 704/273, 275

[56] References Cited

U.S. PATENT DOCUMENTS 5,799,273 8/1998 Mitchell et al. ........................ 704/235
5,909,667 6/1999 Leontiades et al. .................... 704/275
5,937,380 8/1999 Segan ...................................... 704/235

*Primary Examiner*—David R. Hudspeth
*Assistant Examiner*—Susan Wieland
*Attorney, Agent, or Firm*—Quarles & Brady LLP

[57] ABSTRACT

A method for managing a speech application, comprising the steps of: categorizing text from a sequential list of playable elements recorded in a dictation session into segments of only dictated playable elements and segments of only non-dictated playable elements; and, playing back the list of playable elements audibly on a segment-by-segment basis, the segments of dictated playable elements being played back from previously recorded audio and the segments of non-dictated playable elements being played back with a text-to-speech engine. The list of playable elements can be played back without having to determine during the playing back, on a playable-element-by-playable-element basis, whether previously recorded audio is available. The list of playable elements can be simultaneously played back audibly and displayed whether the playable elements are dictated or non-dictated.

9 Claims, 14 Drawing Sheets

COMBINED AUDIO PLAYBACK IN SPEECH RECOGNITION PROOFREADER

BACKGROUND OF THE INVENTION

1. Field of the Invention

This invention relates generally to a proofreader operable with a speech recognition application, and in particular, to a proofreader capable of using both dictated audio and text-to-speech to play back dictated and non-dictated text from a previous dictation session.

2. Description of Related Art

The difficulty of detecting incorrectly interpreted words in a document dictated through speech recognition software is compounded by the fact that the incorrect words may be both orthographically and grammatically correct, rendering spell-checkers and grammar-checkers useless for such detection. For example, suppose a user dictated the sentence "This is text." but the speech recognition system interpreted the sentence as "This is taxed." The latter sentence is both orthographically and grammatically correct, but yet, the sentence is still wrong. A spell checker will not detect any errors and neither will a grammar checker. Clearly, there is a long-felt need for an improved method and apparatus for detecting interpretation errors, especially for large documents.

SUMMARY OF THE INVENTION

In accordance with the inventive arrangements, a method for playing both text-to-speech audio and the originally dictated audio in a seamless, combined fashion that will help the user detect incongruities between what was spoken and what was typed satisfies the long-felt need.

Such a method can be implemented in the form of a proofreader, associated with the speech application, that plays back text both graphically and audibly so that the user can quickly see the disparity between what was said and what was typed. The audible representation of text can include text-to-speech (TTS) and the original, dictated audio recording associated with the text. The proofreader can provide word-by-word playback, wherein the text associated with the audio would be highlighted or separately displayed while the associated audio is played simultaneously.

However, since a dictated document will often contain a mixture of dictated and non-dictated text, it is clear that such a proofreader cannot rely solely on the originally dictated audio. Playing only dictated audio would result in silence whenever non-dictated text is encountered. Not only would this be distracting in and of itself, but it would also require the sudden, focused and exclusive use of visual cues for proofreading during the duration of the non-dictated portions. For those reasons, the proofreader in accordance with the inventive arrangements plays both dictated audio and TTS whenever appropriate and, in order to minimize distractions, the proofreader does so in a substantially seamless manner. Moreover, in addition to playing a range of text, the proofreader is capable of playing individual words, allowing the user to play each word one at a time, moving forward or backward through the text as the user wishes.

A list of recorded words is established. Once such a list is available, it is a simple matter to examine each word of the list in sequence and play the audio accordingly. However, the overhead of reading and interpreting the data and initializing the corresponding audio player on a word-by-word basis results in a low-performance solution, wherein the words cannot be played back as quickly as possible. In addition, playing an individual tag can sometimes result in the playback of a small portion of surrounding dictated audio. Pre-determined segments are used to overcome these problems in accordance with the inventive arrangements.

In accordance with the inventive arrangements, segments within the word list are categorized according to their inclusion of dictated text. If the first word is dictated, then the first segment is dictated, otherwise it is a TTS segment. Subsequent segments are identified whenever a word is encountered whose type is not compatible with the preceding segment. For example, if a previous segment was dictated and a non-dictated word is encountered, then a new TTS segment is created. Conversely, if the previous segment was TTS and a dictated word is encountered then a new dictated segment is created. Each word is read in sequence, but on a segment-by-segment basis, which so significantly reduces the overhead involved with changing between playing back recorded audio and playing back with TTS that the combined playback is essentially seamless.

A method for managing audio playback in a speech recognition proofreader, in accordance with an inventive arrangement, comprises the steps of: categorizing text from a sequential list of playable elements recorded in a dictation session into segments of only dictated playable elements and segments of only non-dictated playable elements; and, playing back the list of playable elements audibly on a segment-by-segment basis, the segments of dictated playable elements being played back from previously recorded audio and the segments of non-dictated playable elements being played back with a text-to-speech engine, whereby the list of playable elements can be played back without having to determine during the playing back, on a playable-element-by-playable-element basis, whether previously recorded audio is available.

The method can further comprise the step of, prior to the catergorizing step, creating the sequential list of playable elements.

The creating step can comprise the steps of: sequentially storing the dictated words and text corresponding to the dictated words, resulting from the dictation session, as some of the playable elements; and, storing text created or modified during editing of the dictated words, in accordance with the sequence established by the sequentially storing step, as others of the playable elements.

The method can further comprise the steps of: limiting the categorizing step to a user selected range of playable elements within the ordered list; and, playing back only the playable elements in the selected range. The upper and lower limits of the user selected range can be adjusted where necessary to include only whole playable elements.

A method for managing a speech application, in accordance with another inventive arrangement comprises the steps of: creating a sequential list of dictated playable elements and non-dictated playable elements; categorizing the sequential list into segments of only dictated playable elements and segments of only non-dictated playable elements; and, playing back the list of playable elements audibly on a segment-by-segment basis, the segments of dictated playable elements being played back from previously recorded audio and the segments of non-dictated playable elements being played back with a text-to-speech engine, whereby the list of playable elements can be played back without having to determine during the playing back, on a playable-element-by-playable-element basis, whether previously recorded audio is available.

The method can further comprise the steps of: storing tags linking the dictated playable elements to respective text recognized by a speech recognition engine; displaying the respective recognized text in time coincidence with playing back each of the dictated playable elements; and, displaying the non-dictated playable elements in time coincidence with the TTS engine audibly playing corresponding ones of the non-dictated playable elements, whereby the list of playable elements can be simultaneously played back audibly and displayed.

The method can also further comprise the steps of: limiting the categorizing step to a user selected range of playable elements within the ordered list; and, playing back the playable elements and displaying the corresponding text only in the selected range. The upper and lower limits of the user selected range can be adjusted where necessary to include only whole playable elements.

DETAILED DESCRIPTION OF THE PREFERRED EMBODIMENTS

General Operation

At a high system level, a combined audio playback system in accordance with the inventive arrangements comprises four primary components: (1) the user; (2) the client application which the user has invoked in order to dictate or otherwise manipulate or display text; (3) the proofreader, which the user invokes through the client, either from a menu, a button or some other means; and, (4) existing text-to-speech (TTS) and speech engines, which are used by the proofreader to play the audible representations of the text.

The terms "client" and "client application" are used herein to refer to a software program that: (a) loads, initializes and uses a speech recognition interface for either the generation and/or manipulation of dictated text and audio; and, (b) loads, initializes and uses the proofreading code as taught herein.

Figure 1:
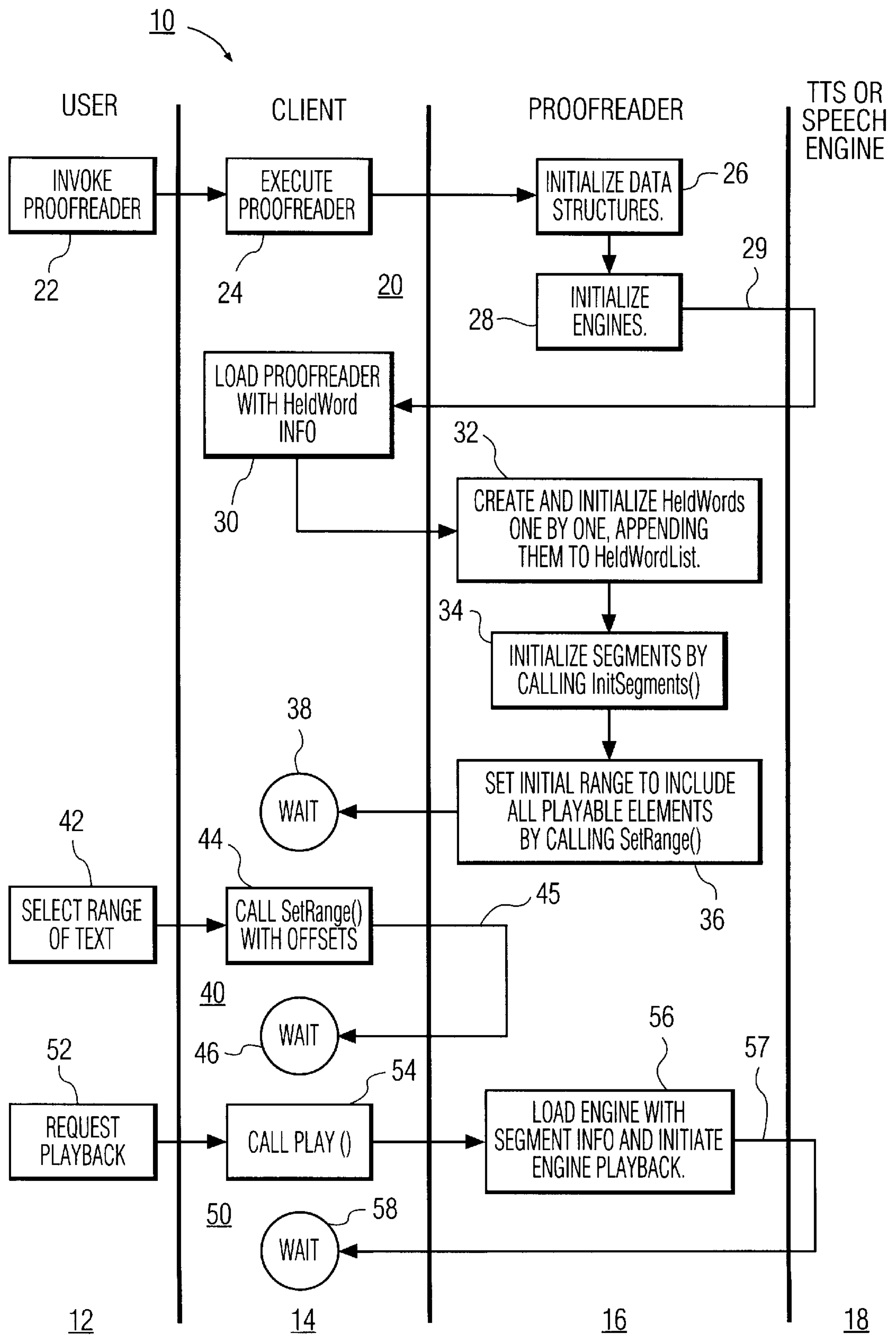
FIG. 1 is a flow chart useful for explaining the inventive arrangements at a high system level.
Figure 2:
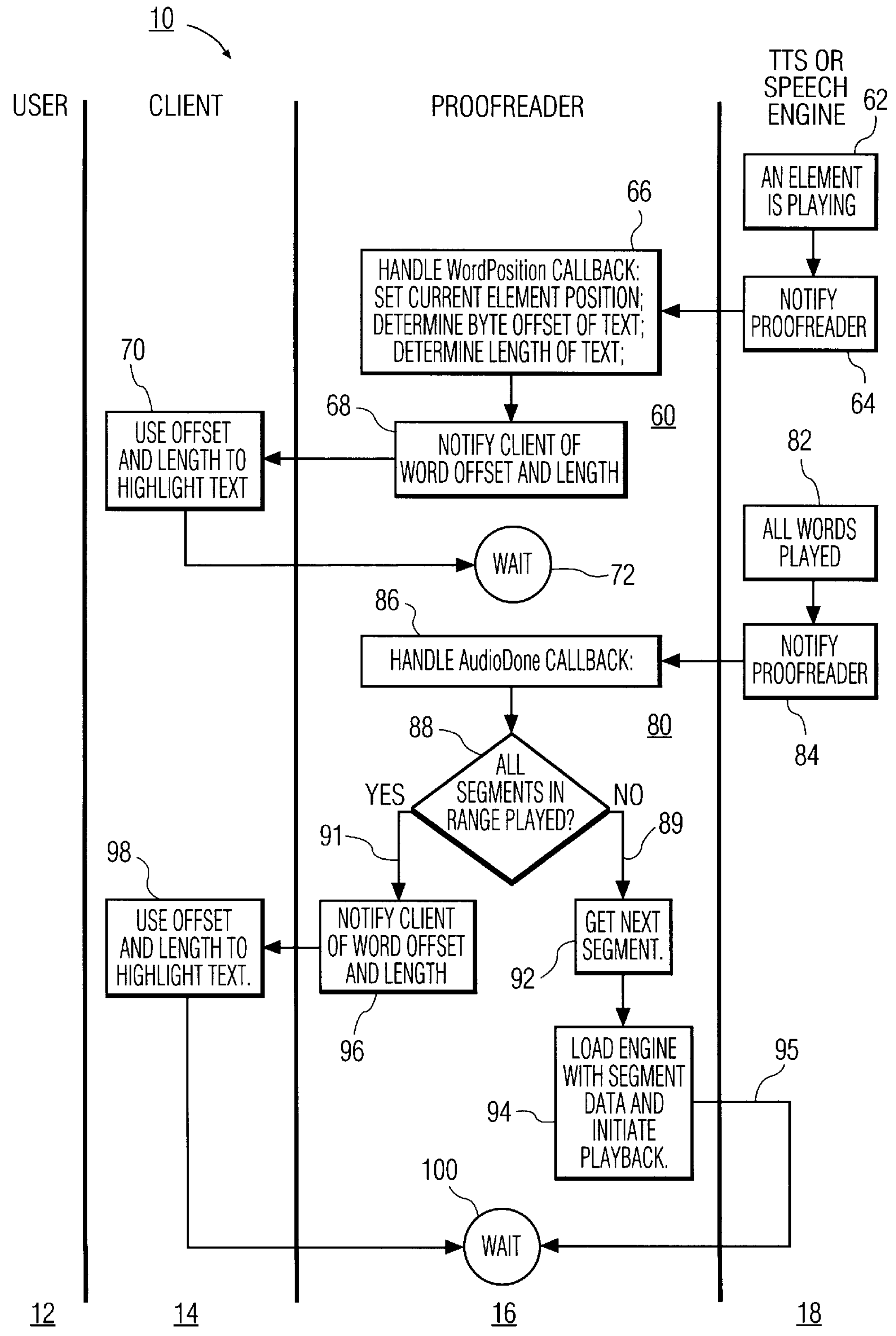
FIG. 2 is a flow chart useful for explaining general callback handling.

The high level system is illustrated in FIGS. 1 and 2, wherein the overall system 10 comprises the user component 12, the client component 14, the proofreader component 16 and the TTS or speech engine 18. The flow charts shown in FIGS. 1 and 2 are sequential not only in accordance with the arrows connecting the various blocks, but with respect to the vertical position of the blocks within each of the component areas.

Three flow charts which together show the general operation from initial invocation to the completion of playback are shown in FIG. 1. The flow charts represent a high system level within which the inventive arrangements can be implemented. The method represented by FIG. 1 is provided primarily as a reference point by which the purpose and overall operation of the proofreader can be more easily understood.

In essence, the client 14 provides a means by which the user 12 can invoke the proofreader 16 as shown by flow chart 20, select a range of text as shown by flow chart 40, and request playback of the selected text and play individual words in sequence, going either forward or backward through the text, a shown in flow chart 50.

More particularly, in the method represented by flow chart 20, the user invokes the proofreader in accordance with the step of block 22. In response, the client executes the proofreader in accordance with the step of block 24. In response, the proofreader initializes the data structures in accordance with the step of block 26 and the initializes the TTS or speech engine in accordance with the step of block 28. Thereafter, path 29 passes through the TTS or speech engine and the client then loads the proofreader with HeldWord information in accordance with the step of block 30. Within the proofreader, the correspondence between text and audio is maintained through a data structure called a HeldWord and through a list of HeldWords called a HeldWordList. The HeldWords structure is defined later in Table 1. The proofreader then creates and initializes the HeldWords one-by-one, appending the HeldWords to the HeldWord list in accordance with the step of block 32. The proofreader then initializes segments by calling InitSegment() in accordance with the step of block 34 and sets the initial range to include all playable elements by calling SetRange() in accordance with the step of block 36. Initializing segments is explained in detail later in connection with FIG. 3. Setting the range is later explained in detail in connection with FIG. 4. Thereafter, the client waits for the next user invocation in accordance with the step of block 38.

In the method represented by flow chart 40, the user selects a range of text in accordance with the step of block 42. In response, the client calls SetRange() with offsets in accordance with the step of block 44. Finding offsets is later explained in detail in connection with FIG. 6. Path 45 passes through the proofreader and the client returns to a wait state in accordance with the step of block 46.

In the method represented by flow chart 50, the user requests playback in accordance with the step of block 52. In response, the client calls Play() in accordance with the step of block 54. The Play, and Play Word calls are later explained in detail in connection with FIGS. 7 and 12 respectively. In response, the proofreader loads the TTS or speech engine with segment information and initiates TTS or speech engine playback in accordance with the step of block 56. Path 57 passes through the TTS or speech engine and the client returns to a wait state in accordance with the step of block 48. Additional optional controls not shown in FIG. 1 include the ability to stop and resume playback, rewind, and the like.

Callback handling is illustrated by flow charts 60 and 80 in FIG. 2. Flow chart 60 begins with an element playing in block 62. The proofreader is notified in accordance with the step of block 64. When the engine notifies a client application of the position of the word currently playing, such notifications are referred to herein as WordPosition callbacks. The proofreader handles the WordPosition callback in accordance with the step of block 66 by setting the current element position, determining the byte offset of the text and determining the length of the text. Thereafter, the proofreader notifies the client of the word offset and length in accordance with the step of block 68. The client then uses the offset and length to highlight the text in accordance with the step of block 70, after which the proofreader returns to a wait state in accordance with the step of block 72.

Flow chart 80 begins when all words have been played, in accordance with the step of block 82. When the engine notifies a client application that all of the text provided to the TTS system has been played, such notifications are referred to herein as AudioDone callbacks. The engine notifies the proofreader in accordance with the step of block 84 and the proofreader handles the AudioDone callback in accordance with the step of block 86. The proofreader determines whether all of the segments in the range have been played. Contiguous playable elements of the same type, that is, only dictated or only non-dictated, are grouped in segments in accordance with the inventive arrangements. The segments of playable elements played back can be expected to alternate in sequence between segments of only dictated words and only non-dictated words, although it is possible that text being played back can have only one kind of playable element.

If all of the segments in the range have not been played, the method branches on path 89 to the step of block 92, in accordance with which the proofreader gets the next segment. Path 95 passes through the engine and the proofreader returns to the wait state in accordance with the step of block 100. If all of the segments in the range have been played, the method branches on path 91 to the step of block 96, in accordance with which the proofreader notifies the client of the word offset and length. The client then uses the offset and length to highlight the text playing back in accordance with the step of block 98. Thereafter, the proofreader returns to the wait state in accordance with the step of block 100.

More generally, the proofreader loads the appropriate engine, TTS or speech, with data and initiates playback through that engine when playback is requested. The engine notifies the proofreader each time an individual data element is played, and the proofreader subsequently notifies the client of that element's text position and that element's text length. In the case of TTS the data element is a text word. In the case of dictated audio, the data element is a single recognized spoken word or phrase. Since the range of text as selected by the user can contain a mixture of dictated and non-dictated text, the proofreader must alternate between the two engines as the two types of text are encountered. When an engine has completed playing all its data elements, the engine notifies the proofreader. Since each engine can be called multiple times over the course of playing back the selected range of text, the proofreader can receive multiple notifications as each sub-range of text is played to completion. However, the proofreader notifies the client only when the last element in the full range has been played.

In order for a speech recognition system to play dictated audio, and in order for that system to enable a client to synchronize playback with the highlighting of associated text, the system must provide a means of identifying and accessing the individually recognized spoken words or phrases. For example, the IBM® ViaVoice® speech recognition system provides unique numerical identifiers, called tags, for each individually recognized spoken word or phrase. During the course of dictation, the speech system sends the tags and associated text to a client application. When dictation has ended the client can use the tags to direct the speech system to play the associated audio. The term "tag" is used herein to refer to any form of identifier or access mechanism that allows the client application to obtain information about and to manipulate spoken utterances as recorded and stored by any speech system.

Since the tagged text may or may not contain multiple words, it is incumbent upon the client application to retain the correspondence between a single tag and its text. For example, the phrase "New York" is assigned a single tag although it contains multiple words. In addition, the user may have entered text manually so it is a further requirement that dictated and non-dictated text be clearly distinguishable. The term "raw text" is used herein to denote non-dictated text that is playable by a TTS engine and which results in audio output. Blanks, spaces and other characters, which do not result in audio output when passed to a TTS engine, are referred to as "white space" and are considered un-playable. Once dictation has ended, the client application can invoke the proofreader, loading the proofreader with the tags, dictated text, raw text and all necessary correspondences. The proofreader can then proceed with its operation.

The HeldWords data structure, which as noted above maintains the correspondences between text and audio within the proofreader, is defined in Table 1.

TABLE 1

HeldWord Structure Definition

| Variable Name | Data Type | Description |
|---|---|---|
| m_tag | Number | Identifier for the spoken word as understood by the speech system. |
| m_text | Text string | The text associated with the tag (if any) and as displayed by the client application |
| m_dictated | Boolean | Indicates whether or not the word was dictated. |
| m_offset | Number | Character indexed offset, relative to the client text. |
| m_length | Number | Number of characters in m_text. |
| m_firstElement | Number | Character index of first TTS playable word. |
| m_lastElement | Number | Character index of last TTS playable word. |
| m_blanks | Boolean | Indicates whether or not the m_text contains only white space. |

The client application provides, at a minimum, the values for m_tag, m_text, m_dictated, m_offset and m_length; and the information must be provided in sequence. That is, the concatenation of m_text for each HeldWord must result in a text string that is exactly equal to the string as displayed by the client application. The text in the client application is referred to herein as "ClientText". The same text, replicated in the proofreader, is referred to as "LocalText". Although the client can provide m_firstElement, m_lastElement and m_blanks, this is not necessary as this data can easily be determined by the proofreader itself.

As the proofreader receives each HeldWord it is appended to an internal HeldWordList. HeldWordList can be implemented as a simple indexed array or as a singly or doubly linked list. For the purpose of explanation herein the HeldWordList is assumed to be an indexed array.

Playable Elements

In order to understand the operation of the proofreader the concept of a "playable element" is introduced. In this design, dictated audio is played in preference to TTS whenever text selected by the user is associated with a dictated HeldWord. A dictated HeldWord, complete with its associated text, whether completely white space or not, is therefore a single playable element. By contrast, textual words contained in non-dictated HeldWords are each an individual playable element. As noted before, non-dictated white space is not playable by itself.

Segments

Once the HeldWordList is established it would be a simple matter to examine each HeldWord in sequence and play the audio accordingly. However, the overhead of reading and interpreting the data and iniaualizing the corresponding audio player on a word-by-word basis results in a low-performance solution, wherein the words cannot be played back as quickly as possible. In addition, playing an individual tag sometimes results in the playback of a small portion of surrounding dictated audio. However, if provided with a list of sequential tags the playback appears as natural and normal speech. Pre-determined segments in accordance with the inventive arrangements are used to overcome these problems.

Segments within the HeldWordList are categorized according to their inclusion of dictated text. If the first HeldWord is dictated, then the first segment is dictated, otherwise it is a TTS segment. Subsequent segments are identified whenever a HeldWord is encountered whose type is not compatible with the preceding segment. For example, if a previous segment was dictated and a non-dictated, raw text HeldWord is encountered, then a new TTS segment is created. Conversely, if the previous segment was TTS and a dictated HeldWord is encountered then a new dictated segment is created. A non-dictated, blank HeldWord is compatible with either segment type, so no new segment is created when such a HeldWord is encountered.

Each HeldWord is read in sequence, starting with the first, and its text is appended to a global variable, LocalText, which serves to replicate ClientText. Additionally, if the HeldWord is dictated, its tag is appended to a global array variable called TagArray. As each segment is identified a SegmentData structure, as defined in Table 2, is created and initialized with pertinent information and then appended to global array variable called SegmentDataArray. As with HeldWordList, SegmentDataArray can be a simple, indexed array or a singly or doubly linked list. As before, SegmentDataArray is be assumed to be an indexed array.

TABLE 2

SegmentData structure definition

| Variable Name | Data Type | Description |
|---|---|---|
| m_offset | Number | Character offset of the segment with respect to the client text. |
| m_length | Number | Count of all characters in this segment, including white space. |
| m_type | Number | Identifies the type of segment, either TTS or dictated. |
| m_playNext | Boolean | Indicates whether or not to play the next segment, if any. Default = TRUE. |
| m_firstElement | Number | Index of the first playable element in the segment. |
| m_lastElement | Number | Index of the last playable element in the segment. |
| m_playFrom | Number | Index of the first element to play. Default = m_firstElement. |
| m_playTo | Number | Index of the last element to play. Default = m_lastElement. |

Figure 3:
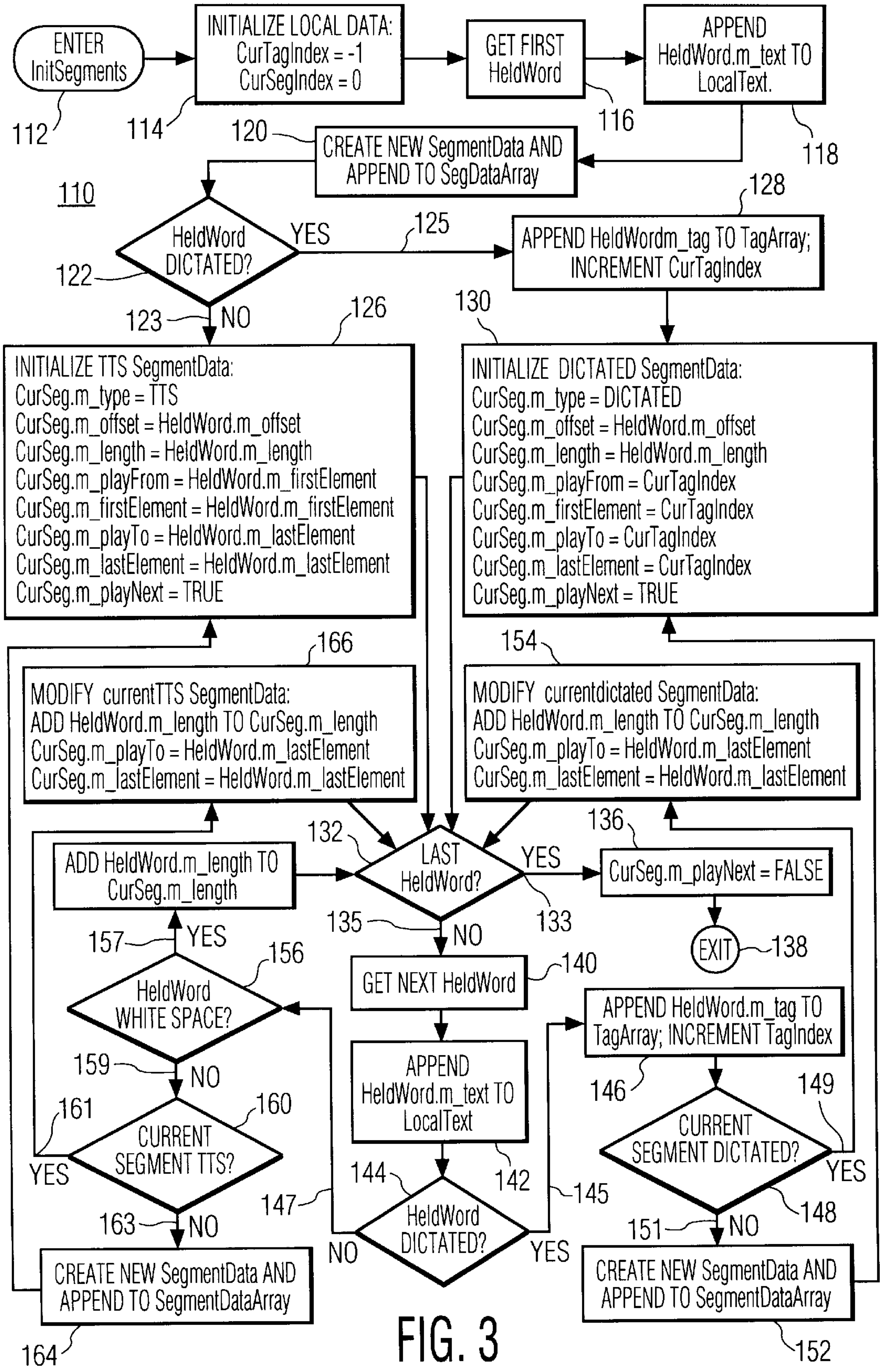
FIG. 3 is a flow chart useful for explaining initializing segments.

The flowchart 110 in FIG. 3 illustrates the logic for segment initialization, performed within a function named InitSegments(). The Initsegments function is entered in accordance with the step of block 112. Data is initialized, as shown, in accordance with the step of block 114. The first HeldWord is retrieved in accordance with the step of block 116. HeldWord.m_text is appended to LocalText in accordance with the step of block 118. A new SegmentData is created and appended to SegDataArray in accordance with the step of block 120.

In accordance with the step of decision block 122, a determination is made as to whether the HeldWord is a dictated word. If the HeldWord is not a dictated word, the method branches on path 123 to the step of block 126, in accordance with which the TTS SegmentData is initialized. CurSeg.m_type is set to TTS, CurSeg.m_offset is set to HeldWord.m_offset, CurSeg.m_length is set to HeldWord.m_length, CurSeg.m_playFrom is set to HeldWord.m_firstElement, CurSeg.m_firstElement is set to HeldWord.m_firstElement, CurSeg.m_playTo is set to HeldWord.m_lastElement, CurSeg.m_lastElement is set to HeldWord.m_lastElement, and CurSeg.m_playNext is set to true. Thereafter, the method moves to decision block 132. If the HeldWord is a dictated word, the method branches on path 125 to the step of block 128, in accordance with which HeldWord.m_tag is appended to TagArray and CurTagIndex is incremented. Dictated SegmentData is initialized in accordance with the step of block 130. CurSeg.m_type is set to dictated, CurSeg.m_offset is set to HeldWord.mOffset, CurSeg.m_length is set to HeldWord.m_length, CurSeg.m_playFrom is set to CurTagIndex, CurSeg.m_firstElement is set to CurTagIndex, CurSeg.m_playTo is set to CurTagIndex, CurSeg.m_lastElement is set to CurTagIndex, and CurSeg.m_playNext is set to true. Thereafter, the method moves to decision block 132.

In accordance with the step of decision block 132, a determination is made as to whether the current word is the last HeldWord. If so, the method branches on path 133 to the step of block 136, in accordance with which CurSeg.m_playNext is set to False, after which the program exits in accordance with the step of block 138. If the current word is not the last word, the method branches on path 135 to the step of block 140, in accordance with which the next HeldWord is retrieved. HeldWord.m_text is appended to LocalText.

In accordance with the step of decision block 144, a determination is made as to whether the HeldWord is a dictated word. If the HeldWord is a dictated word, the method branches on path 145 to the step of block 146, in accordance with which HeldWord.m_tag is appended to TagArray and CurTagIndex is incremented. In accordance with the step of decision block 148, a determination is made as to whether the current segment is dictated. If so, the method branches on path 149 to the step of block 154, in accordance with which current dictated SegmentData is modified. HeldWord.m_length is added to CurSeg.m_ length, CurSeg.m_playTo is set to HeldWord.m_lastElement, and CurSeg.m_lastElement is set to HeldWord.m_lastElement. If the current segment is not dictated, new SegmentData is created and appended to SegmentDataArray in accordance with the step of block 152, and the method goes back to the step of block 130. If the HeldWord is not a dictated word, in accordance with decision block 144, the method branches on path 147 to decision block 156.

In accordance with the step of decision block 156, a determination is made as to whether the HeldWord is white space. If so, the method branches on path 157 to the step of block 158, in accordance with which HeldWord.m_length is added to CurSeg.m_length. Thereafter, the method moves to decision block 132. If the HeldWord is not white space, the method branches on path 159 to decision block 160.

In accordance with the step of decision block 160, a determination is made as to whether the current segment is a TTS segment, that is, a segment having non-dictated words. If so, the method branches on path 161 to the step of block 166, in accordance with which current TTS SegmentData is modified. HeldWord.m_length is added to CurSeg.m_length, CurSeg.m_playTo is set to HeldWord.m_lastElement, and CurSeg.m_lastElement is set to HeldWord.m_lastElement. Thereafter, the method moves back to decision block 132. If the current segment is not a TTS segment, the method branches on path 163 to the step of block 164, in accordance with which new SegmentData is created and appended to SegmentDataArray. Thereafter, the method moves back to the step of block 126.

In order to enable playback several global variables are maintained in the proofreader's memory space. These variables are defined in Table 3.

TABLE 3

Global data variables within the proofreader

| Variable Name | Data Type | Description |
|---|---|---|
| HeldWordList | Array of HeldWords | Used to store the sequence of HeldWords as provided by the client and modified by the proofreader. |
| TagArray | Array of tags | Used to store the sequence of dictated tags found in HeldWordList. |
| SegmentDataArray | Array of SegmentData structures | Used to store the sequence of SegmentData structures |
| gCurrentSegment | Number | An index into SegmentDataArray specifying the current segment. |
| gRequestedStart | Number | The starting offset requested in a call to SetRange( ). |
| gRequestedEnd | Number | The ending offset requested in a call to SetRange( ). |
| gActualStartPos | PRPosition | The position of the first element to play. (See Table 4 on page for a definition of PRPosition.) |
| gActualEndPos | PRPosition | The position of the last element to play. (See Table 4 on page for a definition of PRPosition.) |
| gCurrentPos | PRPosition | The position of the element currently playing, or if the proofreader is paused, the element last played. |

Audio Engine Initialization and Assumptions

In order to play the audible representations of the text the audio engines must be initialized for general operation. For any TTS engine, the details of initialization independent of playback are unique for each manufacturer and are not explained in detail herein. The same is true for any speech engine. However, prior to playback, every attempt should be made to initialize each engine type as fully as possible so that re-initialization, when toggling from TTS to dictated audio and back again, will be minimized. This contributes to the seamless playback.

Since the TTS engines and programmatic interfaces provided by various manufacturers differ in their details, a generic TTS engine is described at an abstract level. In this regard, it is assumed that the following features are characteristic of any TTS engine used in accordance with the inventive arrangements. (1) The TTS engine can be loaded with a text string, either through a memory address of the string's first character or through some other mechanism specifed by the engine manufacturer. (2) The number of characters to play isdetermined either bya variable, or a special delimiter at the end of thestring, or some other mechanism specified by the engine manufacturer. (3) The TTS engine provides a function that can be called that will initiate playback corresponding with the loaded information. This function may or may not include the information provided in features 1 and 2 above. (4) The TTS engine notifies the client whenever the TTS engine has begun playing an individual word and provides, at a minimum, a character offset corresponding to the beginning of the word. The notification occurs asynchronously through the use of a callback function specified by the proofreader and executed by the engine. (5) The TTS engine notifies the client when playback has ended. The notification occurs asynchronously through the use of a callback function specified by the proofreader and executed by the engine.

Similarly, it is assumed that a speech recognition engine used in accordance with the inventive arrangements will have the following capabilities. (1) The speech recognition engine can be loaded with an array of tags, either through a memory address of the array's first tag or through some other mechanism specified by the engine manufacturer. (2) The number of tags to play is determined either by a variable, or a special delimiter at the end of the array, or some other mechanism specified by the engine manufacturer. (3) The speech recognition engine provides a function that initiates playback of the tags. This function may or may not include the information provided in assumptions 1 and 2 above. (4) The speech recognition engine notifies the caller whenever it has begun playing an individual tag and provides the tag associated with current spoken word or phrase. The notification occurs asynchronously through the use of a callback function specified by the proofreader and executed by the engine. (5) The speech recognition engine notifies the caller when all the tags have been played. The notification occurs asynchronously through the use of a callback function specified by the proofreader and executed by the engine.

Selecting a Playback Range

For purposes of this section, it is convenient to note again that the term "WordPosition" is used to generically describe any function or other mechanism used to notify a TTS or speech system client that a word or tag is being played. The term "AudioDone" is used to generically describe any function or other mechanism used to notify a TTS or speech system client that all specified data has been played to completion. In addition, the terms "PRWordPosition" and "PRAudioDone" are used to generically describe any function or mechanism executed by the proofreader and used to notify the client of similar word position and playback completion status, respectively.

In order to eliminate the need for a client to load new data into the proofreader every time the user selects a range of text to proofread, a SetRange() function is provided which accepts two numerical values, requestedStart and requestedEnd, specifying the beginning and ending offsets relative to ClientText. SetRange() analyzes the specified offsets and computes actual positional data based on the specified offsets' proximity to playable elements in the HeldWord list. Since the requested offsets need not correspond precisely to the beginning of a playable element approximations can be required, resulting in the actual positions as calculated.

Figure 4:
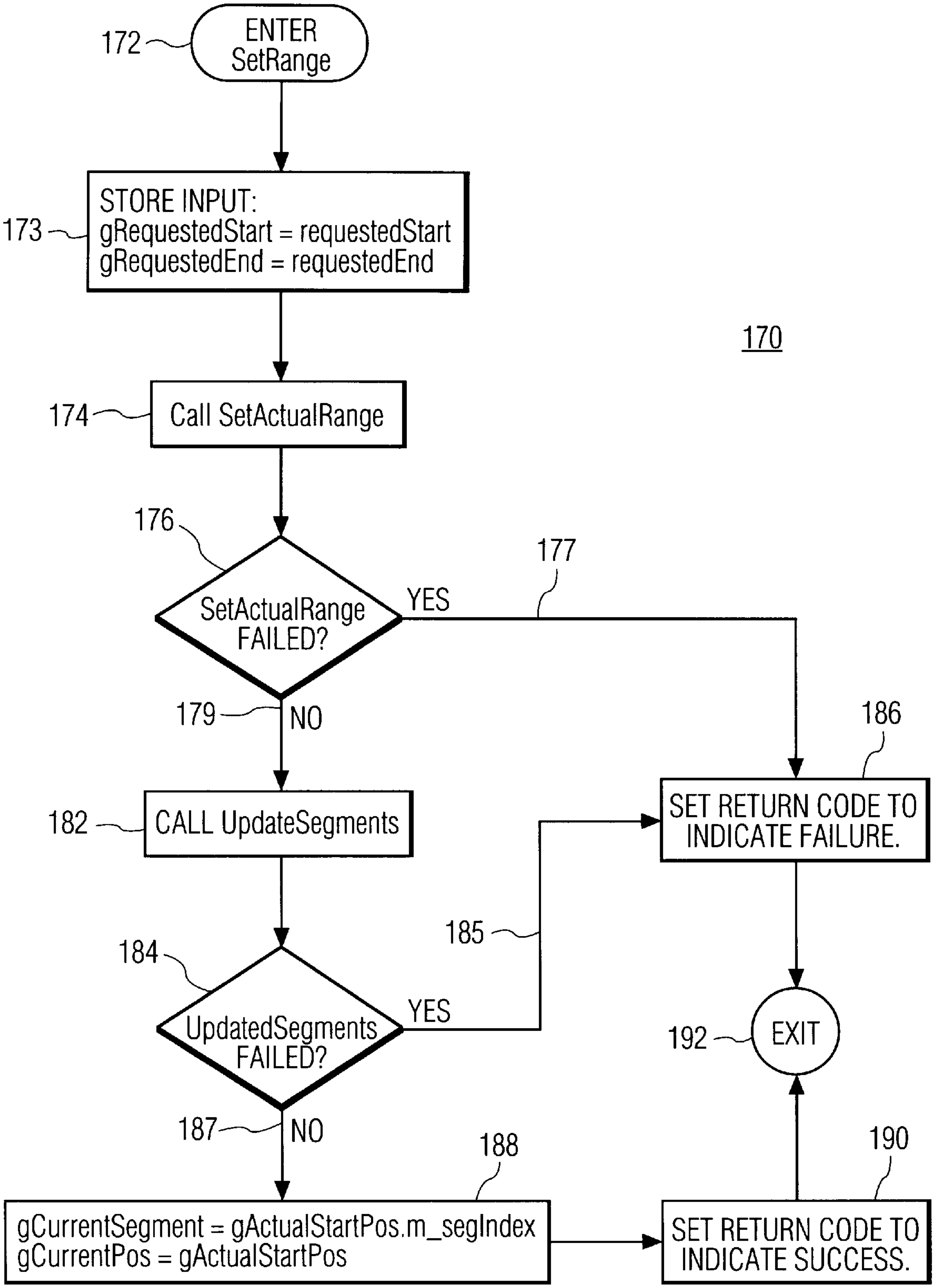
FIG. 4 is a flow chart useful for explaining setting a range.

A flow chart 170 illustrating the SetRange function is shown in FIG. 4. The SetRange function is entered in the step of block 172. Two inputs are stored in accordance with the step of block 173. GrequestedStart is set to requestedStart and gRequestedEnd is set to requestedEnd. SetActualRange is then called in accordance with the step of block 174. In accordance with the step of decision block 176, a determination is made as to whether SetActualRange has failed. If so, the method branches on path 177 to the step of block 186, in accordance with which a return code is set to indicate failure. Thereafter, the function exits in accordance with the step of block 192. If SetActualRange has not failed, the method branches on path 179 to the step of block 182, in accordance with which UpdateSegments is called.

Thereafter, a determination is made in accordance with the step of decision block 184 as to whether the UpdateSegments step has failed. If so, the method branches on path 185 to the step of block 186. If the UpdateSegments step has not failed, the method branches on path 187 to the step of block 188, in accordance with which gCurrentSegment is set to gActualStartPos.m_segIndex and gCurrentPos is set to gActualStartPos. Thereafter, the return code is set to indicate success in accordance with the step of block 190. The function then exits in accordance with the step of block 192.

Figure 5:
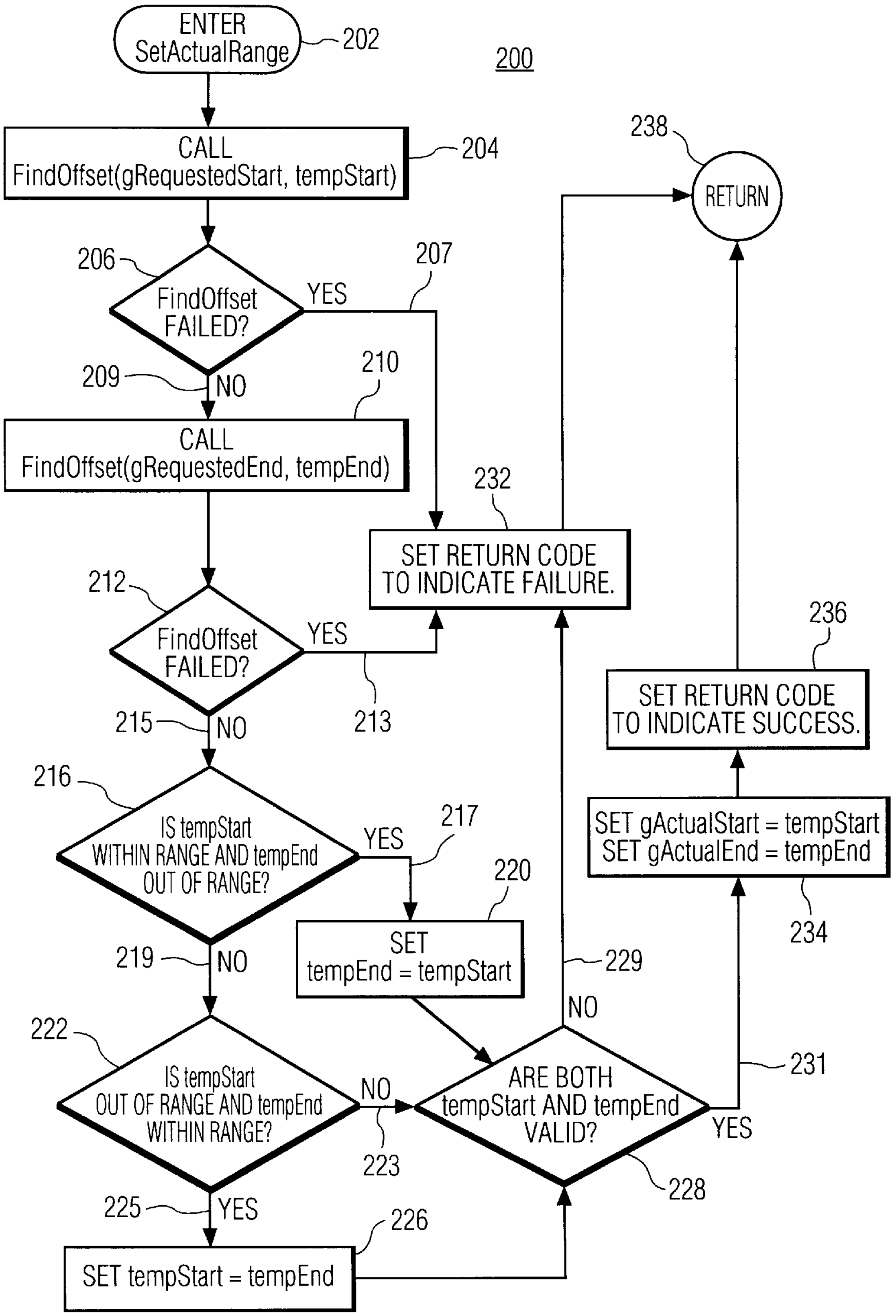
FIG. 5 is a flow chart useful for explaining setting an actual range.
Figure 6:
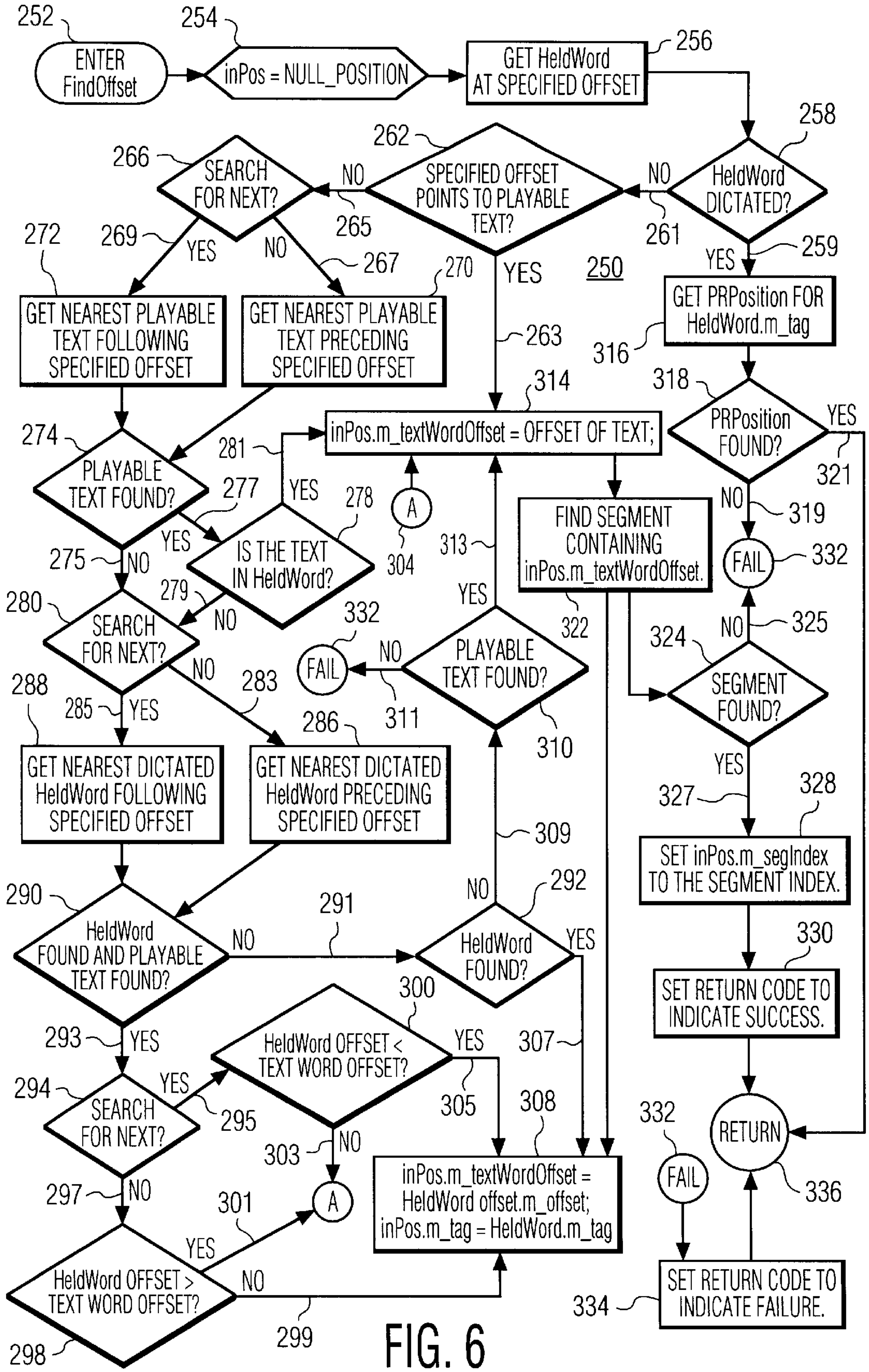
FIG. 6 is a flow chart useful for explaining finding an offset.

The SetActualRange function called in flow chart 170 is illustrated by flow chart 200 shown in FIG. 5. SetActualRange is entered in accordance with the step of block 202. The findOffset function, described in detail in connection with FIG. 6 is called in accordance with the step of block 204 with respect to gRequestedStart and tempStart. It should be noted that tempStart is a local, temporary variable within the scope of the SetActualStart() function. In accordance with the step of decision block 206, a determination is made as to whether FindOffset has failed. If so, the method branches on path 207 to the step of block 232, in accordance with which a return code is set to indicate failure. Thereafter, the function returns in accordance with the step of block 238.

If findOffset has not failed, the method branches on path 209 to the step of block 210, in accordance with which the findOffset function is called for gRequestedEnd and tempEnd. Thereafter, the method moves to the step of decisin block 212, in accordance with which a determination is made as to whether findOffset has failed. If so, the method branches on path 213 to the step of block 232, explained above. If not, the method branches on path 215 to decision block 216, in accordance with which it is determined whether tempStart is within range and tempEnd is out of range. If so, the method branches on path 217 to the step of block 220, in accordance with which tempEnd is set to tempStart. Thereafter, the method moves to decision block 228, described below. If the determination in the step of block 216 is negative, the method branches on path 219 to the step of decision block 222, in accordance with which it is determined whether tempStart is out of range and tempEnd is within range. If not, the method branches on path 223 to the step of decision block 228, described below. If the determination in the step of block 222 is affirmative, the method branches on path 225 to the step of block 226, in accordance with which tempStart is set to tempEnd. Thereafter, the method moves to decision block 228.

The step of decision block 228 determines whether both tempStart and tempEnd are valid. If not, the method branches on path 229 to the set failure return code step of block 232. If the determination of decision block 228 is affirmative, the method branches on path 231 to the step of block 234, in accordance with which gActualStart is set to tempStart and gActualEnd is set to tempEnd. Thereafter, a return code to indicate success is set in accordance with the step of block 236, and the call returns in accordance with the step of block 238.

The difficulty in setting a range within a combined TTS and speech audio playback mode is that the character offsets selected by the user need not directly correspond to any playable data. The offsets can point directly to non-dictated white space. Additionally, either offset can fall within the middle of non-dictated raw text, or can fall within the middle of multiple-word text associated with a single dictated tag, or can fall within a completely blank dictated HeldWord.

In order to facilitate position determination and minimize processing during playback a PRPosition data structure is defined, as shown in Table 4. The data structure is an advantageous convenience providing all information needed to find a playable element, either within TagArray, HeldWordList or SegmentData. By calculating this information just once when needed, no further recalculation is necessary.

TABLE 4

PRPosition data structure.

| Variable Name | Description |
|---|---|
| m_hwIndex | Index into HeldWordList. |
| m_segIndex | Index into SegmentDataArray. |
| m_tagIndex | Index into TagArray. |
| m_textWordOffset | Offset of the beginning of the text of the playable element. Since the text may reside in a non-dictated HeldWord, this value serves to locate the actual text to play via TTS. |

SetRange(), as explained in connection with FIG. 4, generally sets the global variables gRequestedStart and gRequestedEnd to equal the input variables requestedStart and requestedEnd, respectively. SetRange then calls SetActualRange(), described in connection with FIG. 5, which uses FindOffset() to determine the actual PRPosition values for gRequestedStart and gRequestedEnd, which FindOffset() stores in gActualStartPos and gActualEndPos, respectively.

The FindOffset function called in SetActualRange is illustrated by flow chart 250 shown in FIG. 6. Generally, the purpose of FindOffset() is to return a complete PRPosition for the specified offset. If the offset points directly to a playable element then the return of a PRPosition is straightforward. If not, then FindOffseto searches for the nearest playable element, the direction of the search being specified by a variable supplied as input to FindOffset(). A Heldword is first found for the specified offset. If the Heldword is dictated, or if the HeldWord is not dictated but the offset points to playable text within the HeldWord, then FindOffset() is essentially finished. If neither of the foregoing conditions is true, then the search is undertaken.

FindOffset is entered in accordance with the step of block 252. InPos is set to Null_Position in accordance with the step of block 254 and the HeldWord is retrieved from the specified offset in accordance with the step of block 256. The Null_Position PRPosition value is a constant value used to initialize a PRPosition structure to values indicating that the PRPosition structure contains no valid data. In accordance with the step of decision block 258, a determination is made as to whether the HeldWord is a dictated word. If so, the method branches on path 259 to the step of block 316, in accordance with which the PRPosition for Heldword.m_tag is retrieved. Thereafter, in accordance with the step of decision block 318, a determination is made as to whether PRPosition was found. If not, the method branches on path 319 to the fail jump step of block 332, which is a jump to the lower right hand corner of the flow chart. Thereafter, a return code to indicate failure is set in accordance with the step of block 334 and the call returns in accordance with the step of block 336. If PRPosition has been found, the method branches on path 321 to block 330, wherein a return code is set to indicate success, and the call returns in accordance with the step of block 336.

If the HeldWord is determined not to be a dictated word in accordance with the step of block 258, the method branches on path 261 to the step of decision block 262, in accordance with which a determination is made as to whether the specified offset points to playable text. If so, the method branches on path 263 to the step of block 314, in accordance with which inPos.m_textWordOffset is set to offset of text. Thereafter, the method moves to the step block 322, in accordance with which the segment containing in Pos.M_text WordOffset is found.

If the specified offset does not point to playable text in accordance with the step of block 262, the method branches on path 265 to the step of decision block 266, in accordance with which a determination is made as to whether a search for the next playable text is initiated. (This determination relates to the directin of the search, not whether or not the search should continue.) If not, the method branches on path 267 to the step of block 270, in accordance with which the nearest playable text preceding the specified offset is retrieved. If so, the method branches on path 269 to the step of block 272, in accordance with which the nearest playable text following the specified offset is retrieved. From each of blocks 270 and 272 the method moves to the step of decision block 274, in accordance with which a determination is made as to whether playable text has been found. The steps of blocks 270, 272 and 274 search for the nearest TTS playable text.

Generally, if text is found in the Heldword specified by the input offset then FindOffset() is done because it is already known that the HeldWord is not dictated. However, if the However, if the text is not in the Heldword, then it is necessary to find a dictated word nearest the specified offset and use the closer of the two, for the following reason: Any dictated white space following the specified offset will be skipped by the search for the nearest TTS playable text. A single dictated space between two words would be missed if no search was made for both types of playable elements.

Returning to flow chart 250, if playable text has not been found in accordance with the step of decision block 274, the method branches on path 275 to the step of decision block 280. If playable text has been found, the method branches on path 277 to the step of decision block 278, in accordance with which a determination is made as to whether the text is in the HeldWord. If so, the method branches on path 281 to the step of block 314, described above. If not, the method branches on path 279, to the step of decision block 280.

A determination is made in accordance with the step of decision block 280 as to whether to search for the next HeldWord. If not, the method branches on path 283 to the step of block 286, in accordance with which the nearest dictated HeldWord preceding the specified offset is retrieved. If so, the method branches on path 285 to the step of block 288, in accordance with which the nearest dictated HeldWord following the specified offset is retrieved. From each of blocks 286 and 288, the method moves to the step of decision block 290, in accordance with which a determination is made as to whether a HeldWord and playable text have been found. If not, the method branches on path 291 to the step of decision block 292, in accordance with which the questions of block 290 are asked separately. If a HeldWord has been found, the method branches on path 307 to the step of block 308, in accordance with which inPos.m_textWordOffset is set to HeldWord.m_offset and inPos.m tag is set to HeldWord.m_tag. Thereafter, the method moves to block 322, explained above. If a HeldWord was not found in accordance with the step of block 292, the method branches on path 309 to the step of block 310, in accordance with which a determination is made as to whether playable text has been found. If not, the method branches on path 311 to the fail jump step of block 332, explained above. If so, the method branches on path 313 to the step of block 314, explained above.

If a HeldWord and playable text were found in accordance with the step of block 290, the method branches on path 293 to the step of decision block 294, in accordance with which a determination is made as to whether to search for the next HeldWord. If so, the method branches on path 295 to the step of decision block 300, in accordance with which a determination is made as to whether HeldWord offset is less than text word offset. If so, the method branches on path 305 to the step of block 308, explained above. If not, the method branches on path 303 to jump step A of block 304, which is a jump to an input to the step of block 314, explained above.

If there is no search for the next HeldWord in accordance with the step of block 294, the method branches on path 298 to the step of decision block 298, in accordance with which a determination is made as to whether HeldWord offset is greater than text word offset. If not, the method branches on path 299 to the step of block 308, described above. If so, the method branches on path 301 to jump step A of block 301, described above.

From the step of block 308, described above, the method moves to the step of block 322, described above. From the step of block 322, the method moves to the step of decision block 324, in accordance with which a determination is made as to whether a segment has been found. If not, the method branches on path 325 to the fail step of block 332, explained above. If so, the method branches on the path of branch 327 to the step of block 328, in accordance with which inPos.m_segIndex is set to the segment index. Thereafter, the return code is set to indicate success in accordance with the step of block 330 and the call returns in accordance with the step of block 336.

Once the actual start and stop positions are obtained SetRange() modifies any affected SegmentData structures in SegmentDataArray by calling UpdateSegments(). Finally, the global variable gCurrentSegment is set to contain the index of the initial segment within the range specified by gActualStartPos and gActualEndPos and the global variable gCurrentPos is set equal to gActualStartPos.

Playback

Figure 7:
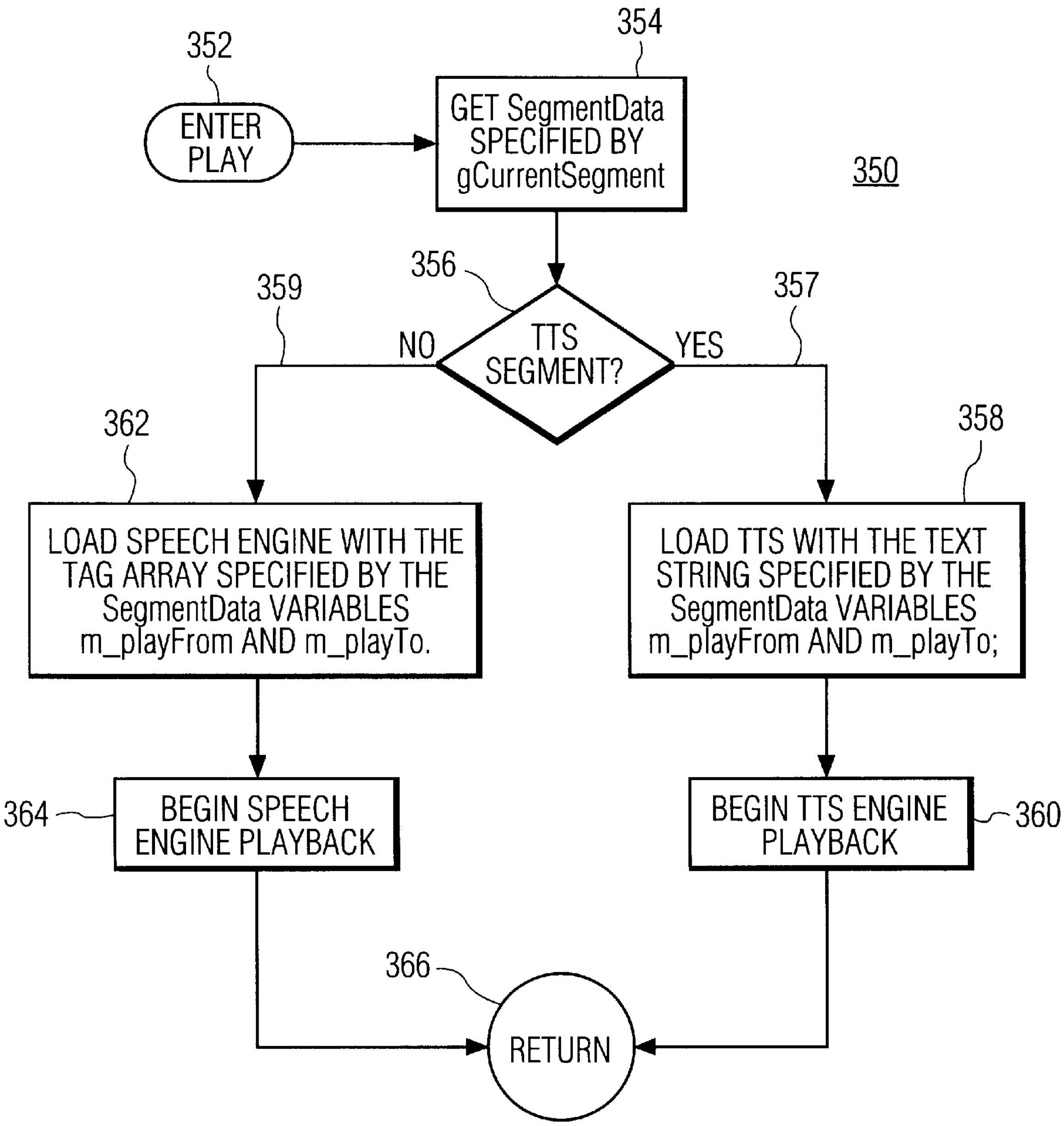
FIG. 7 is a flow chart useful for explaining play.

Once the SegmentDataArray is complete and all audio players are initialized playback is initiated by calling the Play() function. A flow chart 350 illustrating playback via the Play() function is shown in FIG. 7. Play is entered in the step of block 352 and SegmentData specified by gCurrentSegment is retrieved, playback beginning from the current segment as specified by gCurrentSegment. The segment's SegmentData structure is examined in accordance with the step of decision block 356 to determine whether the segment is a TTS segment. If so, the method branches on path 357 to the step of block 358, in accordance with which the TTS engine is loaded with the text string specified by the SegmentData variables m_playFrom and m_playTo. Thereafter, TTS engine playback begins in accordance with the step of block 360 and returns the call in accordance with the step of block 366.

If the segment is not a TTS segment, the method branches on path 359 to the step of block 362, in accordance with which the speech engine is loaded with the tag array specified by the SegmentData variables m_playFrom and m_playTo. Thereafter, speech engine playback begins in accordance with the step of block 364 and returns the call in accordance with the step of block 366.

As the data is being played each engine notifies the caller about the current data position though a WordPosition callback unique to each engine. In the case of TTS the WordPosition callback function takes the offset returned by the engine and converts it to an offset relative to the ClientText. The WordPosition callback function then determines the length of the word located at the offset and sends both the offset and the length to the client through a PRWordPosition callback specified by the client. For speech, the WordPosition callback uses the tag returned by the speech engine to determine the index of the HeldWord within HeldWordList. The WordPosition callback function then retrieves the HeldWord and sends the HeldWord offset and length to the client in a PRWordPosition callback. A range of words can also be selected for playback by callling SetRange() and then Play().

Handling of the PRPosition callback is specific to the client and need not be described in detail. However, the WordPosition handling is a fundamental aspect. Accordingly, the TTS WordPosition callback and the speech WordPosition callback are described in detail in connection with FIGS. 8 and 14 respectively.

Figure 8:
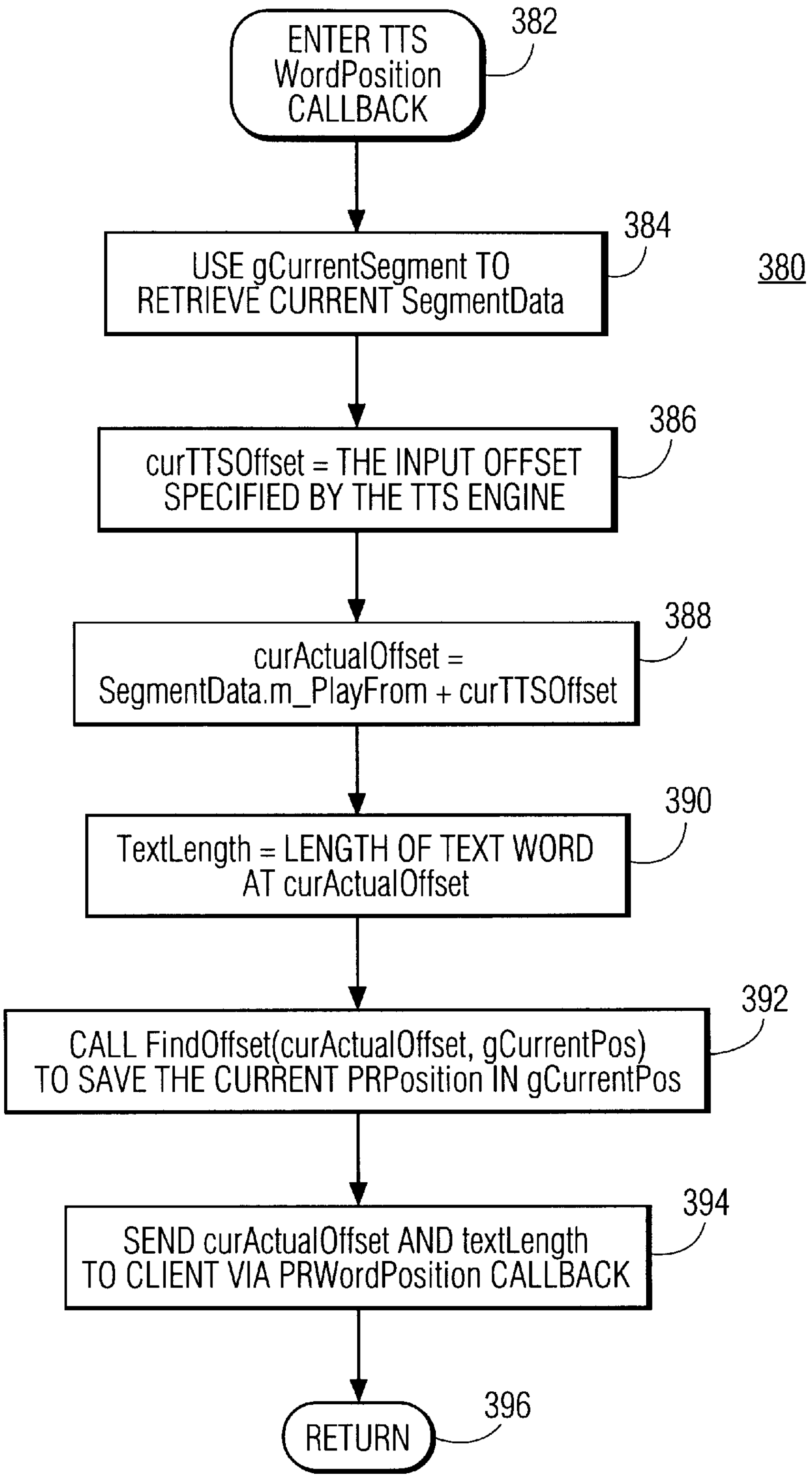
FIG. 8 is a flow chart useful for explaining TTS word position callback.

The TTS WordPosition callback is illustrated by flowchart 380 in FIG. 8. TTS WordPosition callback is entered in accordance with the step of block 382. gCurrentSegment is used to retrieve current SegmentData in accordance with the step of block 384. curTTSOffset is set to the input offset specified by the TTS engine in accordance with the step of block 386. curActualOffset is set to the sum of SegmentData.m_playFrom and curTTSOffset in accordance with the step of block 388. textLength is set to the length of the text word at curActualOffset in accordance with the step of block 390. The FindOffset function is called for curActualOffset and gCurrentPos to save the current PRPosition in gCurrentPos in accordance with the step of block 392. curActualOffset and textLength are sent to the client via the PRWordPosition callback in accordance with the step of block 394. Finally, the call returns in accordance with the step of block 396.

Figure 14:
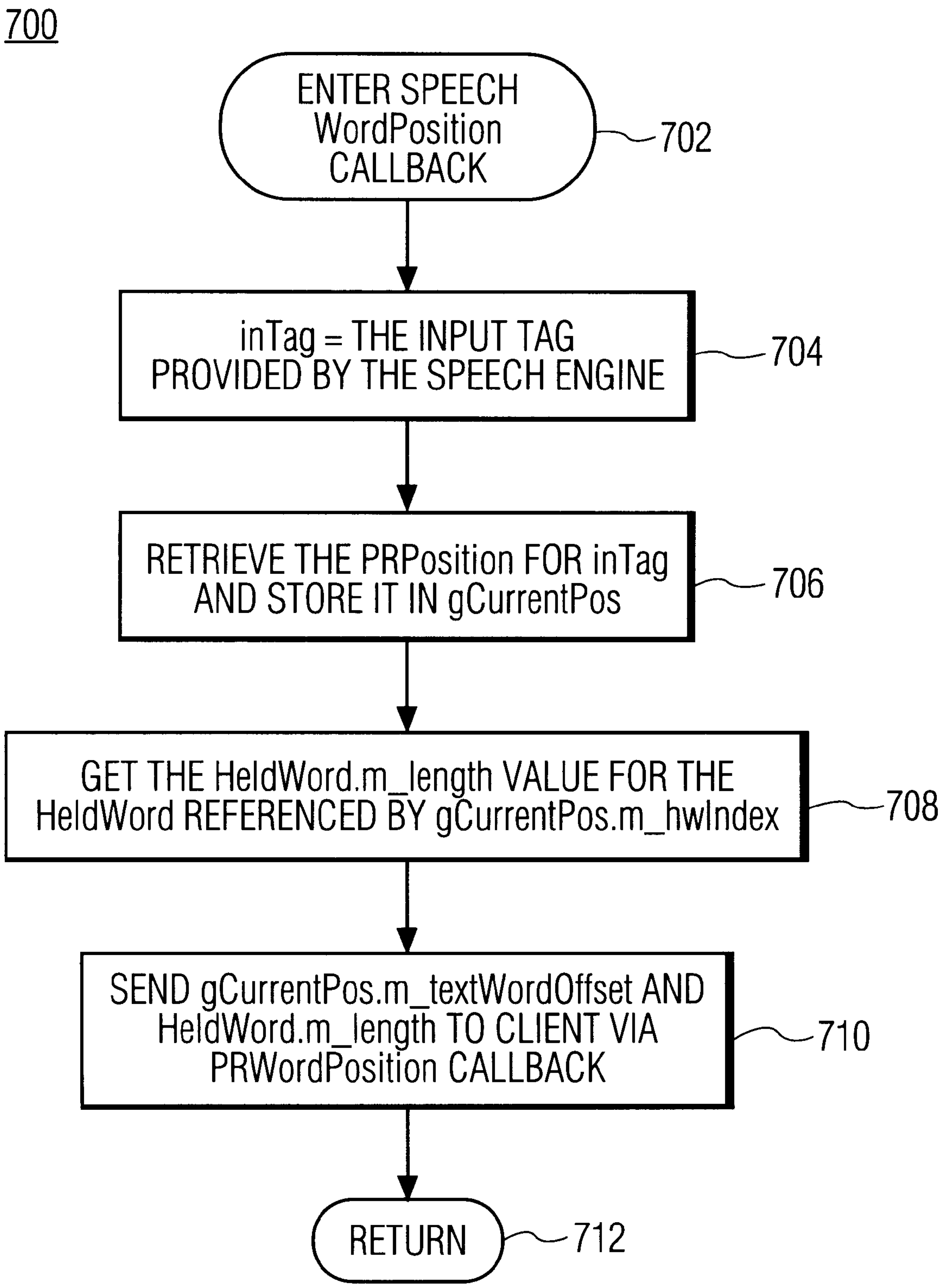
FIG. 14 is a flow chart useful for explaining speech word position callback.

The speech WordPosition callback is illustrated by flow chart 700 in FIG. 14. The speech WordPosition callback is entered in accordance with the step of block 702. inTag is set to the input tag provided by the speech engine in accordance with the step of block 704. The PRPosition for inTag is retrieved and stored in gCurrentPos in accordance with the step of block 706. The HeldWord.m_length value for the HeldWord referenced by gCurrentPos.m_hwIndex is retrieved in accordance with the step of block 708. In accordance with the step of block 710, gCurrentPos.m_textWordOffset and HeldWord.m_length are sent to the client via the PRWordPosition callback. Finally, the call returns in accordance with the step of block 712.

As noted before, the length of a TTS element is the length of a single text word as delimited by white space. The length of a dictated element is the length of the entire HeldWord.m_text variable. HeldWord.m_text could be nothing but white space, or it could be a single word or multiple words. Therefore, providing the length is crucial in allowing the client application to highlight the currently playing text.

Figure 9:
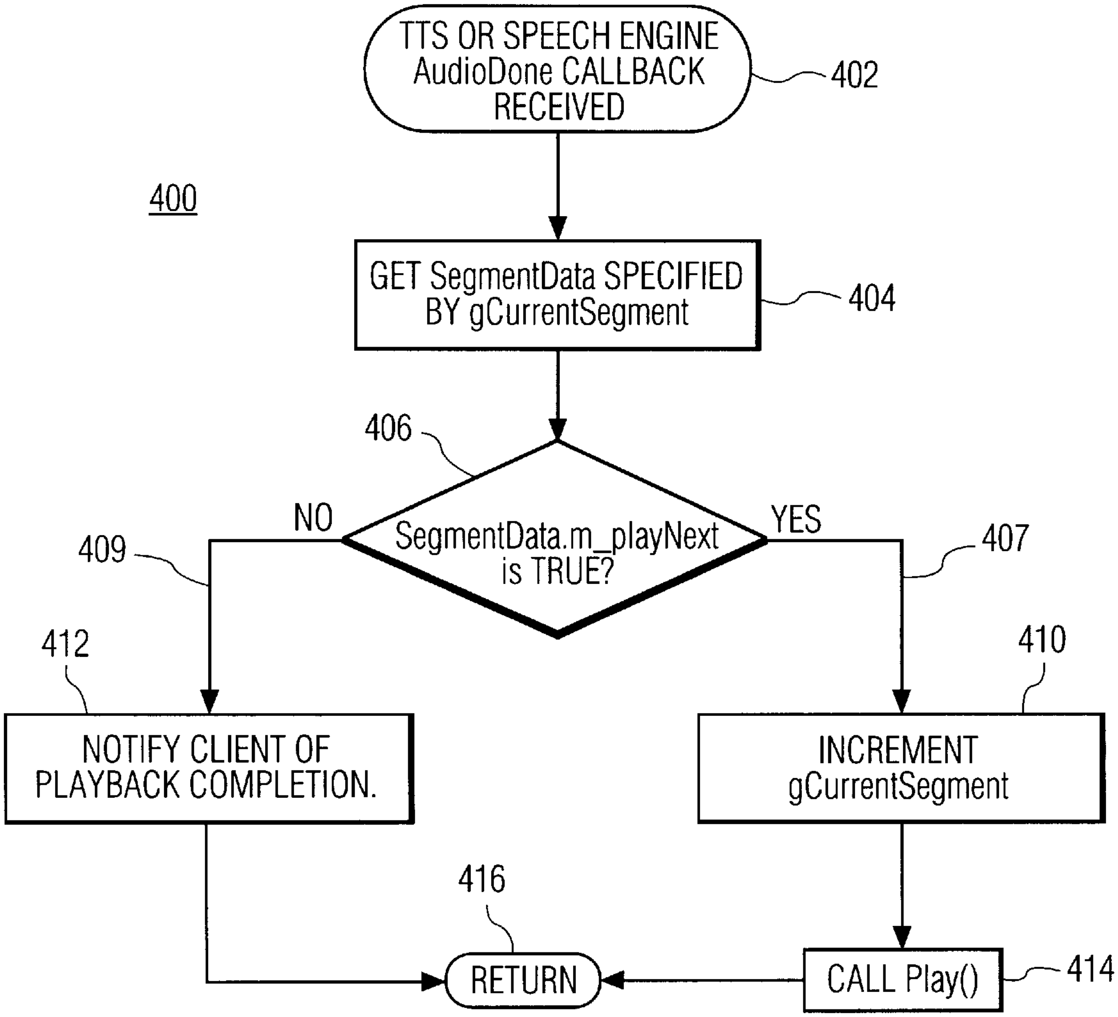
FIG. 9 is a flow chart useful for explaining segment playback completion.

When all of the elements in a segment have been played the current engine calls an AudioDone callback, which alerts the proofreader that playback has ended. A flow chart 400 illustrating the AudioDone function is shown in FIG. 9. A TTS or speech engine AudioDone callback is received in the step of block 402. SegmentData specified by gCurrentSegment is retrieved in accordance with the step of block 404. In accordance with the step of decision block 406, the proofreader examines the current segment and determines whether or not the next segment should be played by determining whether SegmentData.m_playNext is true. If so, the method branches on path 407 to the step of block 410, in accordance with which gCurrentSegment is incremented. The TTS or speech engine, as appropriate, is loaded with the current segment's data and the engine is directed to play the data by calling Play() in accordance with the step of block 414. The proofreader then waits for more WordPosition and AudioDone callbacks in accordance with the step of block 416. If the next segment is NOT supposed to be played, that is, if SegmentData.m_playNext is not true, the method branches on path 409 to the step of block 412, in accordance with which the proofreader calls the client's PRAudioDone callback, alerting it that the data it specified has been completely played. The proofreader then waits for more WordPosition and AudioDone callbacks in accordance with the step of block 416.

Playing Next and Previous Elements Individually

The methods illustrated by the flow charts in FIGS. 1–9, which implement the inventive arrangement of playable elements, provide the framework by which a user can step through a document, forward or backward, playing individual elements one at a time. This ability allows the user to play the next or preceding element, relative to an element, without having to select the element manually, much like playing the next or preceding track on a music CD. Such steps can be invoked by simple keyboard, mouse or voice commands.

Figure 10:
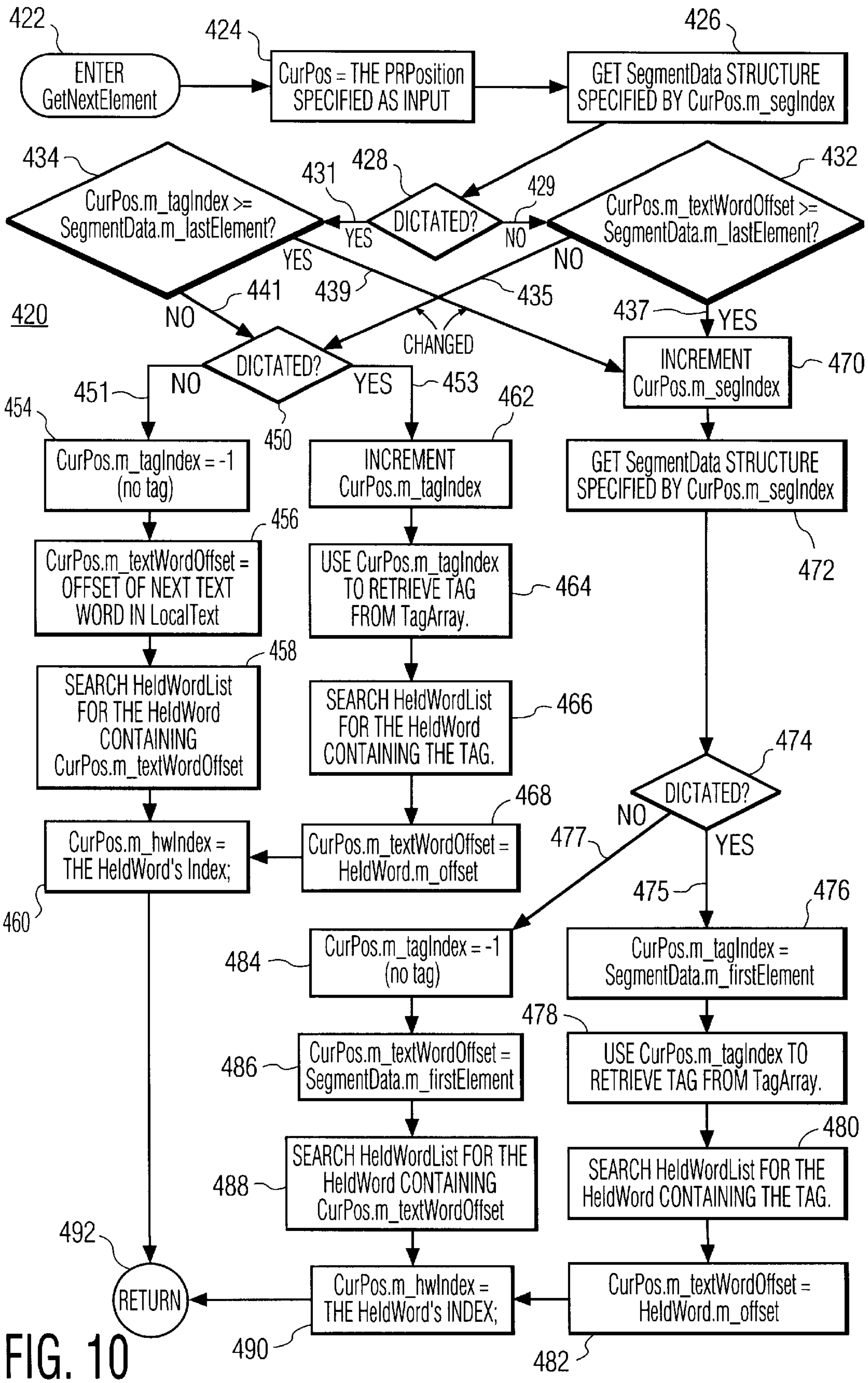
FIG. 10 is a flow chart useful for explaining getting the next element.
Figure 11:
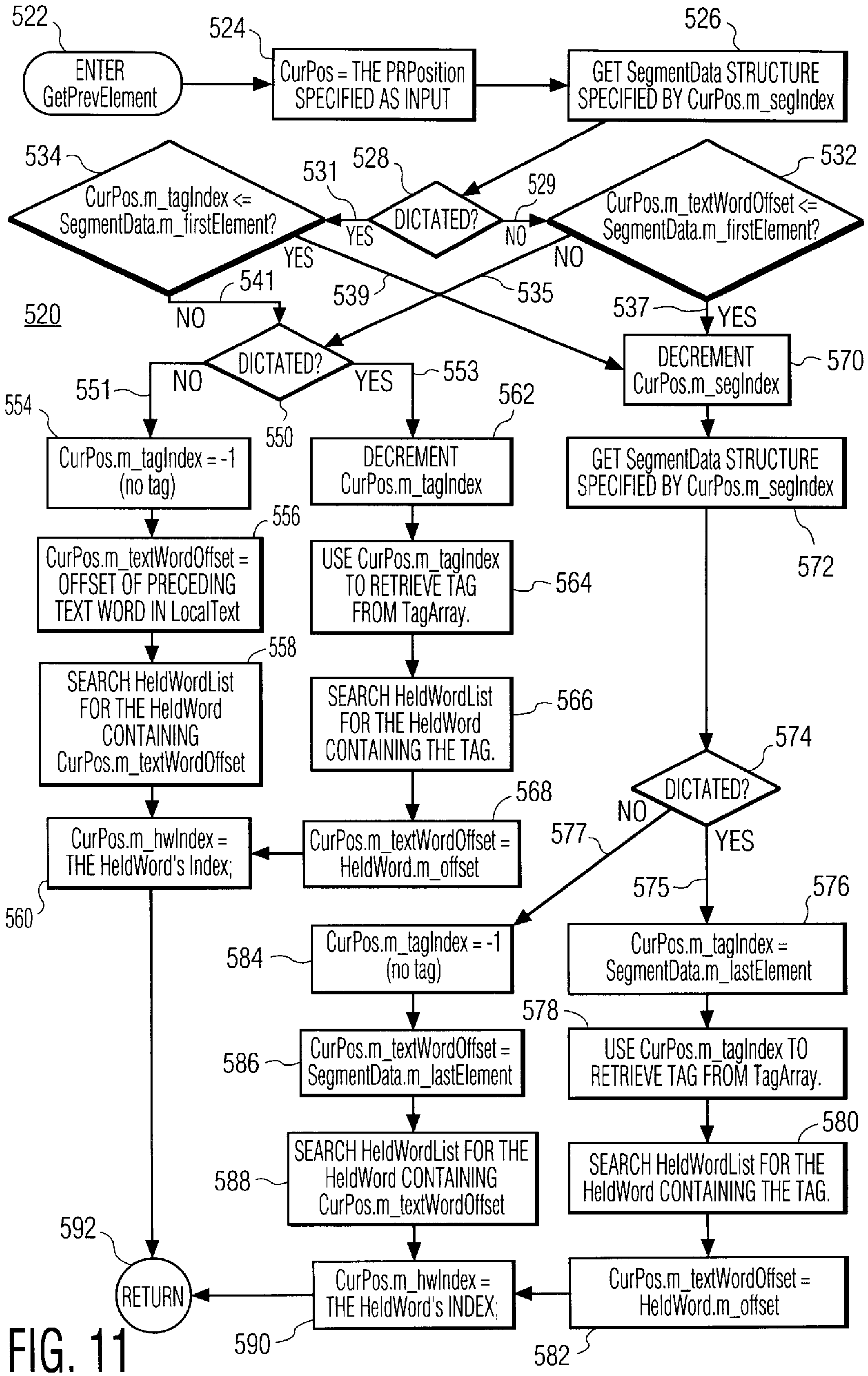
FIG. 11 is a flow chart useful for explaining getting a previous element.

In order to implement this advantageous operation, GetNextElement() and GetPrevElement() functions, shown in FIGS. 10 and 11 respectively, are provided. Both functions accept a PRPosition data structure corresponding to an element and then modify its contents to indicate the next or previous element, respectively. The logic of the two functions determines the nature of the next or previous elements, whether dictated or not, and the returned PRPosition data reflects that determination. Once the PRPosition data is obtained, the client passes the PRPosition data to the proofreader's PlayWord() function, shown in FIG. 12, which plays the individual element. Thus, single-stepping through a range of elements in the forward direction results in exactly the same word-by-word highlighting and audio playback that would have resulted had the user select the same range and invoked the Play() function.

If the client wishes to use the current PRPosition as a base for next or previous element retrieval, the client can retrieve gCurrentPos from the proofreader. If the client wishes to arbitrarily select a base, the client can obtain a PRPosition by calling FindOffset() with theoffset of the text the client wishes to use as the base.

A flow chart 420 illustrating the GetNextElement function in detail is shown in FIG. 10. The GetNextElement function is entered in accordance with the step of block 422. The CurPos is set to the PRPosition specified as input in accordance with the step of block 424 and the SegmentData structure specified by CurPos.m__segIndex is retrieved in accordance with the step of block 426.

In accordance with the step of decision block 428, a determination is made as to whether the retrieved segment is a dictated segment. If not, the method branches on path 429 to the step of decision block 432, in accordance with which a determination is made as to whether CurPos.m__textWordOffset is greater than or equal to SegmentData.m__lastElement. If the retrieved segment is a dictated segment, the method branches on path 431 to the step of decision block 434, in accordance with which a determination is made as to whether CurPos.m__tagIndex is greater than or equal to SegmentData.m__lastElement.

If the determinations of decision blocks 432 and 434 are yes, the method branches on paths 437 and 439 respectively to the step of block 470. If the determinations of decision blocks 432 and 434 are no, the method branches on paths 435 and 441 respectively to the step of block 450.

In accordance with the step of decision block 450 a determination is made as to whether the segment is dictated. If not, the method branches on path 451 to the step of block 454, in accordance with which CurPos.m__tagIndex is set to −1, indicating no tag. The CurPos.m__textWordOffset is set to the offset of the next text word in LocalText in accordance with the step of block 456. The HeldWord list is searched for the HeldWord containing the CurPos.m__textWordOffset in accordance with the step of block 458. The CurPos.m__hwIndex is set to the HeldWord's index in accordance with the step of block 460 and the function returns in accordance with the step of block 492.

If the segment is determined to be dictated in the step of block 450, the method branches on path 453 to the step of block 462, in accordance with which the CurPos.m__tagIndex is incremented. The CurPos.m__tagIndex is used to retrieve the tag from the TagArray in accordance with the step of block 464. The HeldWord list is searched for the HeldWord containing the tag in accordance with the Help of block 466. The CurPos.m__textWordOffset is set to the HeldWord.m__offset in accordance with the step of block 468, and the method moves to the step of block 460, explained above.

In accordance with the step of block 470 CurPos.m__segIndex is incremented. The SegmentData structure specified by CurPos.m__segIndex is retrieved in accordance with the step of block 472, and thereafter, a determination is made in accordance with the step of decision block 474 as to whether the segment is a dictated segment. If so, the method branches on path 475 to the step of block 476, in accordance with which CurPos.m__tagIndex is set to SegmentData.m__firstElement. The CurPos.m__tagIndex is used to retrieve the tag from the TagArray in accordance with the step of block 478. The HeldWord list is searched for the HeldWord containing the tag in accordance with the step of block 480. The CurPos.m__textWordOffset is set to the HeldWord.m__offset in accordance with the step of block 482. The CurPos.m__hwIndex is set to the HeldWord's index in accordance with the step of block 490 and the function returns in accordance with the step of block 492.

If the segment is determined not to be a dictated segment in step 474, the method branches on path 477 to the step of block 484, in accordance with which CurPos.m tagIndex is set to −1, indicating no tag. The CurPos.m__textWordOffset is set to SegmentData.m__firstElement in accordance with the step of block 486. The HeldWord list is searched for the HeldWord containing CurPos.m__textWordOffset in accordance with the step of block 488. Thereafter, the method moves to the step of block 490, explained above.

A flow chart 520 illustrating the GetPrevElement function in detail is shown in FIG. 11. The GetPrevElement function is entered in accordance with the step of block 522. The CurPos is set to the PRPosition specified as input in accordance with the step of block 524 and the SegmentData structure specified by CurPos.m__segIndex is retrieved in accordance with the step of block 526.

In accordance with the step of decision block 528, a determination is made as to whether the retrieved segment is a dictated segment. If not, the method branches on path 529 to the step of decision block 532, in accordance with which a determination is made as to whether CurPos.m__textWordOffset is less than or equal to SegmentData.m__firstElement. If the retrieved segment is a dictated segment, the method branches on path 531 to the step of decision block 534, in accordance with which a determination is made as to whether CurPos.m__tagIndex is less than or equal to SegmentData.m__firstElement.

If the determinations of decision blocks 532 and 534 are yes, the method branches on paths 537 and 539 respectively to the step of block 570. If the determinations of decision blocks 532 and 534 are no, the method branches on paths 535 and 541 respectively to the step of block 550.

In accordance with the step of decision block 550 a determination is made as to whether the segment is dictated. If not, the method branches on path 551 to the step of block 554, in accordance with which CurPos.m__tagIndex is set to −1, indicating no tag. The CurPos.m__textWordOffset is set to the offset of the preceding text word in LocalText in accordance with the step of block 556. The HeldWord list is searched for the HeldWord containing the CurPos.m__textWordOffset in accordance with the step of block 558. The CurPos.m__hwIndex is set to the HeldWord's index in accordance with the step of block 560 and the function returns in accordance with the step of block 592.

If the segment is determined to be dictated in the step of block 550, the method branches on path 553 to the step of block 562, in accordance with which the CurPos.m__tagIndex is decremented. The CurPos.m__tagIndex is used to retrieve the tag from the TagArray in accordance with the step of block 564. The HeldWord list is searched for the HeldWord containing the tag in accordance with the step of block 566. The CurPos.m__textWordOffset is set to the HeldWord.m__offset in accordance with the step of block 568, and the method moves to the step of block 560, explained above.

In accordance with the step of block 570 CurPos.m__segIndex is decremented. The SegmentData structure specified by CurPos.m__segIndex is retrieved in accordance with the step of block 572, and thereafter, a determination is made in accordance with the step of decision block 574 as to whether the segment is a dictated segment. If so, the method branches on path 575 to the step of block 576, in accordance with which CurPos.m__tagIndex is set to SegmentData.m__lastElement. The CurPos.m__tagIndex is used to retrieve the tag from the TagArray in accordance with the step of block 578. The HeldWord list is searched for the HeldWord containing the tag in accordance with the step of block 580. The CurPos.m__textWordOffset is set to the HeldWord.m__offset in accordance with the step of block 582. The CurPos.m__hwIndex is set to the HeldWord's index in accordance with the step of block 590 and the function returns in accordance with the step of block 592.

If the segment is determined not to be a dictated segment in step 574, the method branches on path 577 to the step of block 584, in accordance with which CurPos.m tagIndex is set to −1, indicating no tag. The CurPos.m__textWordOffset is set to SegmentData.m__lastElement in accordance with the step of block 586. The HeldWord list is searched for the HeldWord containing CurPos.m__textWordOffset in accordance with the step of block 588. Thereafter, the method moves to the step of block 590, explained above.

Figure 12:
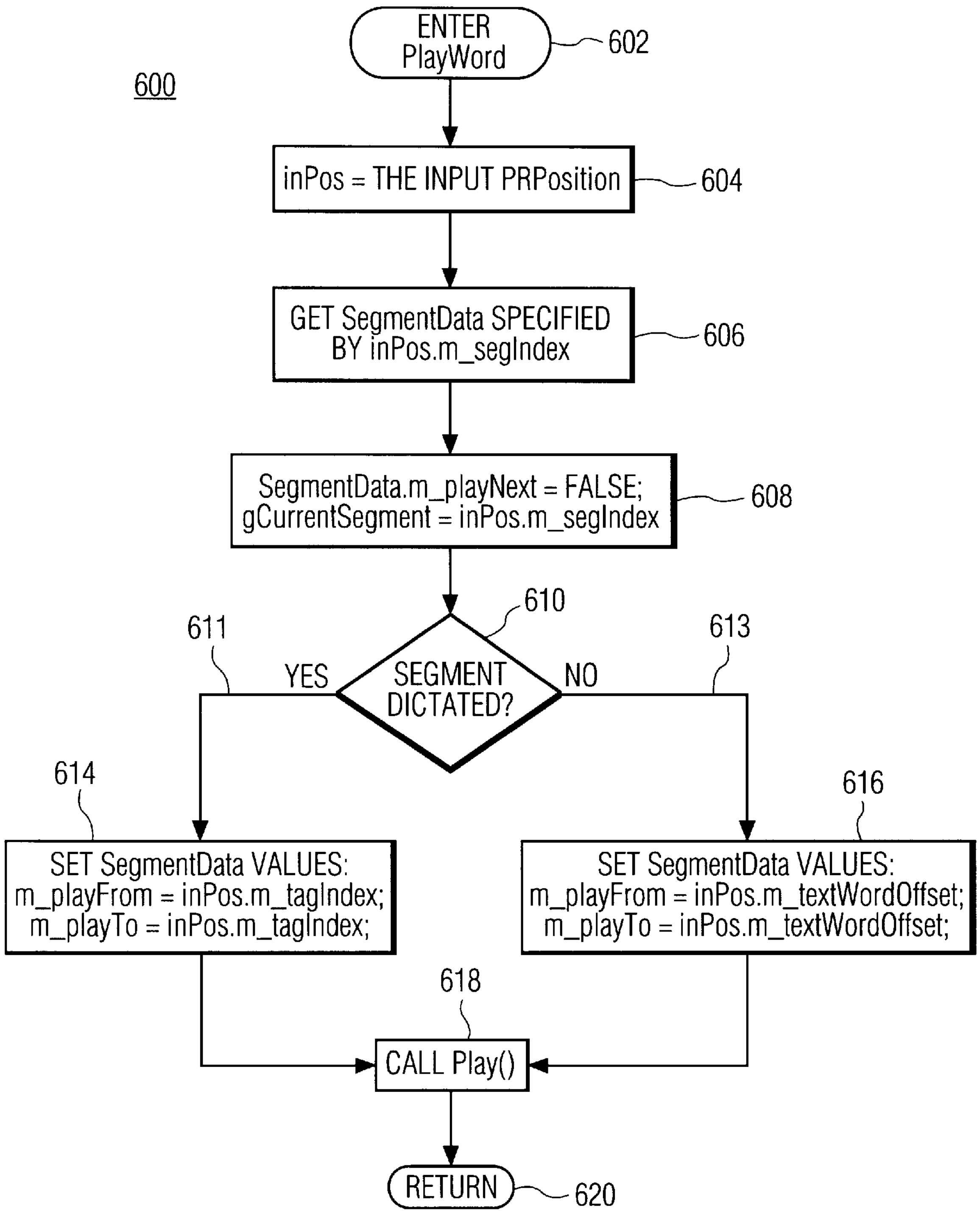
FIG. 12 is a flow chart useful for explaining playing a word.

A flow chart 600 illustrating the PlayWord function is shown in detail in FIG. 12. The PlayWord function is entered in accordance with the step of block 602. The inPos is set to the input PRPosition in accordance with the step of block 604. The SegmentData specified by inPos.m__segIndex is retrieved in accordance with the step of block 606. The SegmentData.m__playNext is set to false and gCurrentSegment is set to inPos.m__segIndex in accordance with the step of block 608.

Thereafter, a determination is made in accordance with the step of decision block 610 as to whether the segment is a dictated segment. If so, the method branches on path 611 to the step of block 614, in accordance with which SegmentData values are set. Both m__playFrom and m__PlayTo are set to inPos.m__tagIndex. If not, the method branches on path 613 to the step of block 616 in accordance with which the SegmentData values are set differently. Both m__playFrom and m__playTo are set to inPos.m__textWordOffset.

From the steps of each of blocks 614 and 616, the Play() function is called in accordance with the step of block 618. Thereafter, the function returns in accordance with the step of block 620.

Figure 13:
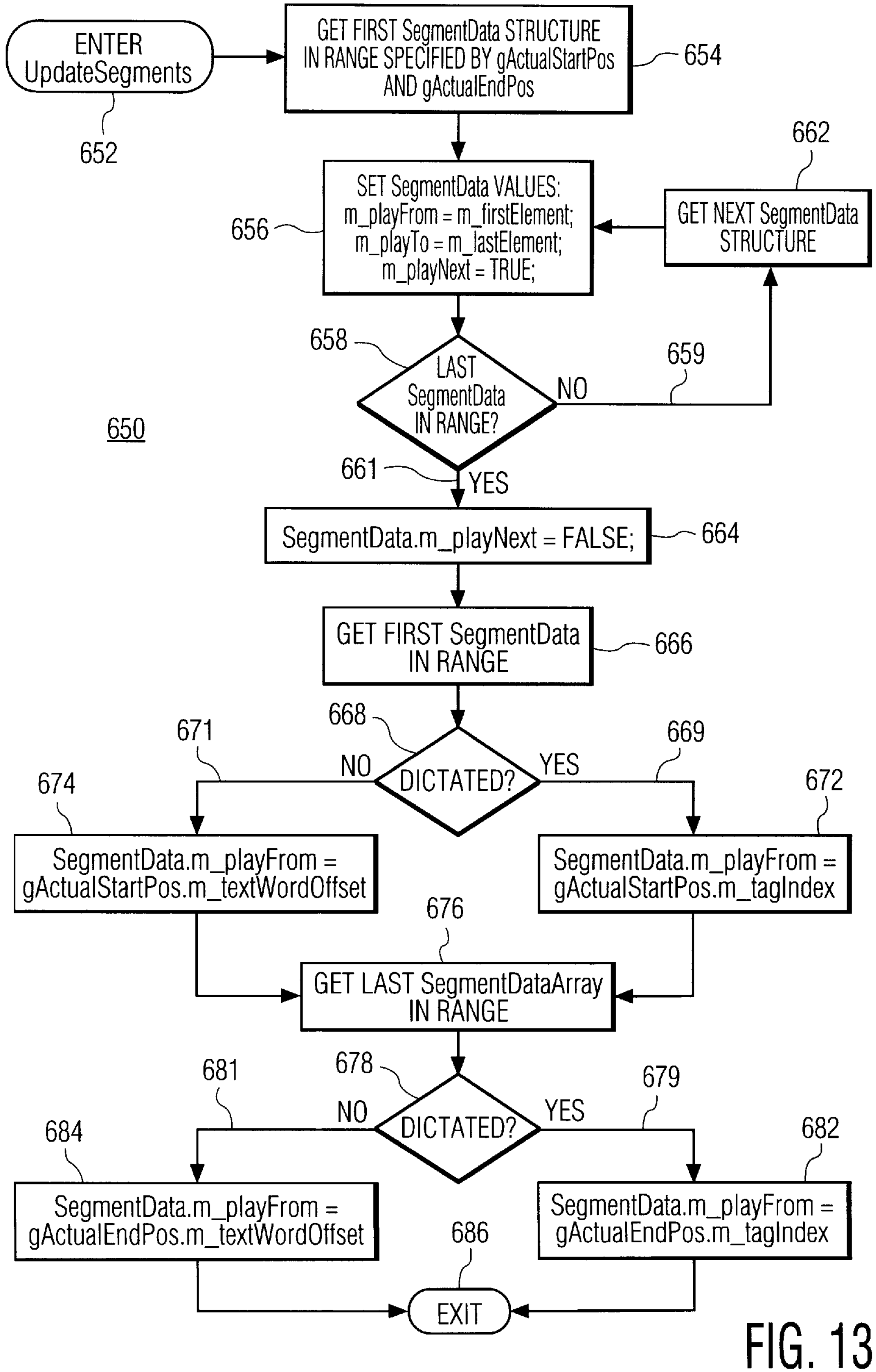
FIG. 13 is a flow chart useful for explaining updating segments.

It can become necessary to update the segments. A flow chart 650 illustrating the UpdateSegments function in detail is shown in FIG. 13. The UpdateSegments function is entered in accordance with the step of block 652. The first SegmentData structure in a range specified by gActualStartPos and gActualEndPos is retrieved in accordance with the step of block 654. SegmentData values are set in accordance with the step of block 656. m__playFrom is set to m__firstElement, m__playTo is set to m__lastElement and m__playNext is set to true.

Thereafter, in accordance with the step of decision block 658, a determination is made as to whether the lastSegmentData in the range has been retrieved. If not, the method branches on path 659 to the step of block 662, in accordance with which the next SegmentData structure is retrieved, and the step of block 656 is repeated. If so, the method branches on path 661 to the step of block 664, in accordance with which SegmentData.m__playNext is set to false. The first SegmentData in the range is then retrieved in accordance with the step of block 666.

Thereafter, in accordance with the step of decision block 668, a determination is made as to whether the first segment is a dictated segment. If so, the method branches on path 669 to the step of block 672, in accordance with which SegmentData.m__playFrom is set to gActualStartPos.m__tagIndex. If not, the method branches on path 671 to the step of block 674, in accordance with which SegmentData.m__playFrom is set to gActualStartPos.m__textWordOffset. After the steps of each of the blocks 672 and 674, the last SegmentData in the range is retrieved in accordance with the step of block 676.

Thereafter, in accordance with the step of decision block 678, a determination is made as to whether the last segment is dictated. If so, the method branches on path 679 and SegmentData.m__playFrom is set to gActualEndPos.m__tagIndex in accordance with the step of block 682. If not, the method branches on path 681 and SegmentData.m__playFrom is set to gActualEnd Pos.m__textWordOffset in accordance with the step of block 684. After the steps of each of the blocks 682 and 684, the function exits in accordance with the step of block 686.

In summary, and in accordance with the inventive arrangements, a proofreader can advantageously accept a mixture of dictated and non-dictated text from a speech recognition system client application. The proofreader can play the audible representations of the text. The representations can advantageously be a mixture of text-to-speech and the originally dictated audio, utilizing existing text-to-speech and speech system engines, in a combined and seamless fashion. The proofreader can advantageously allow a user to select a range of text to play, automatically and advantageously determining the playable elements within and at the extremes of the selected range. The proofreader can advantageously allow users to individually play the preceding and following playable elements adjacent to a current playable element without having to manually select the desired text or element. The proofreader can advantageously provide word-by-word notifications to the client application, providing both the relative offset and textual length of the currently playing element so that the client can advantageously highlight the appropriate text within a designated display area. The combined audio playback system taught herein satisfies all of the deficiencies of the prior art.

What is claimed is:

1. A method for managing audio playback in a speech recognition proofreader, comprising the steps of:

categorizing text from a sequential list of playable elements recorded in a dictation session into either segments consisting of only dictated playable elements or segments consisting of only non-dictated playable elements; and, playing back said list of playable elements audibly on a segment-by-segment basis, said segments of dictated playable elements being played back from previously recorded audio and said segments of non-dictated playable elements being played back with a text-to-speech engine, whereby said list of playable elements can be played back without having to determine during said playing back, on a playable-element-by-playable-element basis, whether previously recorded audio is available.

2. The method of claim 1, further comprising the step of, prior to said catergorizing step, creating said sequential list of playable elements.

3. The method of claim 2, wherein said creating step comprises the steps of:

sequentially storing said dictated words and text corresponding to said dictated words, resulting from said dictation session, as some of said playable elements; and, storing text created or modified during editing of said dictated words, in accordance with said sequence established by said sequentially storing step, as others of said playable elements.

4. The method of claim 1, comprising the steps of:

limiting said categorizing step to a user selected range of playable elements within said ordered list, a first Playable element in said range defining an upper limit and a last playable element in said range defining a lower limit; and, playing back only said playable elements in said selected range.

5. The method of claim 4, further comprising the step of adjusting said upper and lower limits of said user selected range where necessary to include only whole playable elements.

6. A method for managing a speech application, comprising the steps of:

creating a sequential list of dictated playable elements and non-dictated playable elements;

categorizing said sequential list into either segments consisting of only dictated playable elements or segments consisting of only non-dictated playable elements; and, playing back said list of playable elements audibly on a segment-by-segment basis, said segments of dictated playable elements being played back from previously recorded audio and said segments of non-dictated playable elements being played back with a text-to-speech (TTS) engine, whereby said list of playable elements can be played back without having to determine during said playing back, on a playable-element-by-playable-element basis, whether previously recorded audio is available.

7. The method of claim 6, further comprising the steps of:

storing tags linking said dictated playable elements to respective text recognized by a speech recognition engine;

displaying said respective recognized text in time coincidence with playing back each of said dictated playable elements; and, displaying said non-dictated playable elements in time coincidence with said TTS engine audibly playing corresponding ones of said non-dictated playable elements, whereby said list of playable elements can be simultaneously played back audibly and displayed.

8. The method of claim 6, comprising the steps of:

limiting said categorizing step to a user selected range of playable elements within said ordered list, a first playable element in said range defining an upper limit and a last playable element in said range defining a lower limit; and, playing back said playable elements and displaying said corresponding text only in said selected range.

9. The method of claim 8, further comprising the step of adjusting said upper and lower limits of said user selected range where necessary to include only whole playable elements.

* * * * *